United States Patent
Kuge et al.

(10) Patent No.: US 7,386,371 B2
(45) Date of Patent: *Jun. 10, 2008

(54) OPERATION ASSISTANCE SYSTEM AND METHOD

(75) Inventors: Nobuyuki Kuge, Kanagawa-ken (JP); Tomohiro Yamamura, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 82 days.

This patent is subject to a terminal disclaimer.

(21) Appl. No.: 11/012,208

(22) Filed: Dec. 16, 2004

(65) Prior Publication Data

US 2005/0131590 A1    Jun. 16, 2005

(30) Foreign Application Priority Data

Dec. 16, 2003 (JP) ............................. 2003-417744
Dec. 16, 2003 (JP) ............................. 2003-417746
Dec. 16, 2003 (JP) ........................... P2003-417745

(51) Int. Cl.
    *G05D 1/00*    (2006.01)
(52) U.S. Cl. ............................. 701/1; 701/28; 701/29; 701/36; 701/117; 180/168
(58) Field of Classification Search .............. 701/1, 701/23, 28, 41, 42, 88, 93, 117, 29; 180/167, 180/168, 169
See application file for complete search history.

(56) References Cited

U.S. PATENT DOCUMENTS

| | | | |
|---|---|---|---|
| 5,189,621 A | 2/1993 | Onari et al. | |
| 5,546,305 A | 8/1996 | Kondo | |
| 5,911,771 A | 6/1999 | Reichart et al. | |
| 6,049,749 A * | 4/2000 | Kobayashi | 701/49 |
| 6,185,492 B1 * | 2/2001 | Kagawa et al. | 701/41 |
| 6,240,357 B1 | 5/2001 | Bastian | |
| 2002/0013650 A1 | 1/2002 | Kusafuka et al. | |
| 2003/0060936 A1 | 3/2003 | Yamamura et al. | |
| 2003/0233902 A1 | 12/2003 | Hijikata | |
| 2003/0236608 A1 | 12/2003 | Egami | |
| 2004/0172185 A1 | 9/2004 | Yamamura et al. | |

FOREIGN PATENT DOCUMENTS

| | | |
|---|---|---|
| DE | 19620929 A1 | 11/1997 |
| EP | 1347214 A2 | 2/2002 |

(Continued)

OTHER PUBLICATIONS

U.S. Appl. No. 11/012,158, filed Dec. 16, 2004, Kuge et al.

(Continued)

*Primary Examiner*—Gertrude Arthur Jeangla
(74) *Attorney, Agent, or Firm*—McDermott Will & Emery LLP

(57) ABSTRACT

A method and system for providing automatic assistance in operating a machine. A current operation performed by an operator of the machine is detected, and data related to an estimated intention of the operator is generated based on the detected operation. A state of the estimated intention of the operator is then determined. The state indicates, for example, the reliability or strength of the estimated intention. The operation of the machine is altered based on the estimated intention and the state of the estimated intention.

28 Claims, 17 Drawing Sheets

FOREIGN PATENT DOCUMENTS

| | | |
|---|---|---|
| EP | 1 197 683 A | 4/2002 |
| EP | 1375280 A2 | 6/2002 |
| EP | 1285842 A2 | 8/2002 |
| EP | 1426230 A2 | 11/2002 |
| EP | 1357013 A1 | 3/2003 |

OTHER PUBLICATIONS

U.S. Appl. No. 11/012,165, filed Dec. 16, 2004, Yamamura et al.

* cited by examiner

Upon determination that the lane change continues :

terminate    Upon failure to determine that the lane change continues :

OPERATION ASSISTANCE SYSTEM AND METHOD

RELATED APPLICATIONS

The present application claims the benefit of priority from Japanese patent application No. 2003-417744, filed Dec. 16, 2003; Japanese patent application No. 2003-417745, filed Dec. 16, 2003; and Japanese patent application No. 2003-417746, filed Dec. 16, 2003, all of which are incorporated herein by reference in their entireties.

FIELD OF THE DISCLOSURE

The present disclosure relates to system and method for providing assistance based on an operator's intention, and more particularly, to driving assistance system and method for determining a state of an estimated intention of an operator and providing operation assistance accordingly.

BACKGROUND OF THE DISCLOSURE

A number of methods and systems have been proposed for providing assistance in operating a device, system or machine, such as a vehicle. For example, several driving assistance systems were disclosed in U.S. Published Patent Application Nos. 20030060936 A1, published Mar. 27, 2003, and 20040172185 A1, published Sep. 2, 2004. In order to enhance performance, some driving assistance systems may require estimation of a driver's intention in driving a vehicle. A system for estimating a driver's intention may collect estimates of the driver's intention using movement of the driver's eyeballs. For example, directions to which the driver's eyeballs turn are projected onto a plane divided into a number of regions, for calculating a distribution of projected directions over the divided regions to estimate the driver's intention. However, such type of systems lacks accuracy because the driver's eyeballs move all the time and do not always relate to a "driving" intention of the driver.

Therefore, there is a need for reliable intention estimation systems that can estimate an operator's intention with satisfactory accuracy. There is also a need for determining how reliable or how strong an estimated intention is, such that operation assistance can be provided accordingly.

SUMMARY OF THE DISCLOSURE

This disclosure presents system, control process and method that provide effective estimation of an operator's intention in operating a device, system or machine, and indicate a state of the estimation of the operator's intentions, which may indicate the strength of the estimated intention. Operation assistance may be provided based on the state of the estimated intention of the operator. The advantages, operations and detailed structures of the disclosed methods and systems will be appreciated and understood from the descriptions provided herein.

An exemplary system and method according to this disclosure detect an operation performed by an operator of a machine, and generate data related to one or more imaginary operators based on the detected operation. An estimated intention of the operator is then determined based on the generated data related to the one or more imaginary drivers. In one aspect, a state of the estimated intention may determined. The state may indicate the reliability or strength of the estimated intention. For instance, the state may represent a period of time that the operator has retained the estimated intention. The longer the operator retains the intention, the more determined the operator is to perform an action or operation according to the estimated intention.

In one embodiment, an estimated intention of the operator at a specific point in time, and at least one past estimated intention of the operator before the specific point in time are determined. An estimated period of time that the operator retains an estimated intention is determined based on the estimated intention of the operator at the specific point in time and the at least one past estimated intention of the operator before the specific point in time. In one aspect, the machine is a vehicle and the operator is a driver of the vehicle.

According to another embodiment, the estimated intention of the operator is determined by comparing an operation of the operator with reference data, such as data related to a plurality of imaginary operators. Each of the plurality of imaginary operators is associated with a sequence of intentions corresponding to different points in time, wherein each of the sequence of intentions is associated with an operation. For each imaginary operator, a likelihood value is calculated based on partial likelihood values of each imaginary operator corresponding to the different points in time, wherein each of the partial likelihood values is respectively associated with each respective intention and the respective operation at each one of the different points in time, and is generated based on the respective detected operation of the real operator at each one of the different points in time and the respective operation of the respective one of the plurality of imaginary operators at each one of the different points in time. One of the plurality of imaginary operators is selected to approximate to the real operator based on the likelihood value of each one of the imaginary operators. A chosen intention of the selected imaginary operator is used to approximate the intention of the real operator.

In order to determine a state of the estimated intention, such as how long the real operator have retained the estimated intention, the point in time corresponding to the chosen intention and the most recent point in time that the selected imaginary operator retaining an intention different from the chosen intention are determined. The period between the two points in time is used to indicate the state of the estimated intention. The longer this period of time is, the stronger the estimated intention is.

According to still another embodiment, the operation of the machine is adjusted based on the state of the estimated intention. For instance, in a vehicle, a risk potential associated with the vehicle and the driver's intention are constantly monitored and determined. A reaction force to be applied or being applied to a vehicle control device is determined based on the calculated risk potential, the estimated intention and the state of the estimated intention. The vehicle control device may be any device that a driver manipulates to control the operation of the vehicle, such as an acceleration pedal or a steering wheel, or any device that can provide a haptic feedback to the operator. In one embodiment, the risk potential is modified based on the state of the estimated intention, and the reaction force is calculated based on the modified risk potential and the estimated intention. In another embodiment, the reaction force is calculated based on the calculated risk potential and the estimated intention, and is then modified based on the state of the estimated intention.

Additional advantages of the present disclosure will become readily apparent to those skilled in this art from the following detailed description, wherein only the illustrative embodiments are shown and described, simply by way of illustration of the best mode contemplated. As will be realized, the disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

ILLUSTRATIVE EMBODIMENTS OF THE DISCLOSURE

In the following description, for the purposes of explanation, numerous specific details are set forth in order to provide a thorough understanding of the present disclosure. It will be apparent, however, to one skilled in the art that the present method and system may be practiced without these specific details. In other instances, well-known structures and devices are shown in block diagram form in order to avoid unnecessarily obscuring the present disclosure. For illustration purpose, the following examples describe the operation of an exemplary tester used for evaluating a circuit of an automotive vehicle. It is understood that the use of tester is not limited to vehicle circuits. The tester also can be used in other types of electrical circuits.

Figure 1:
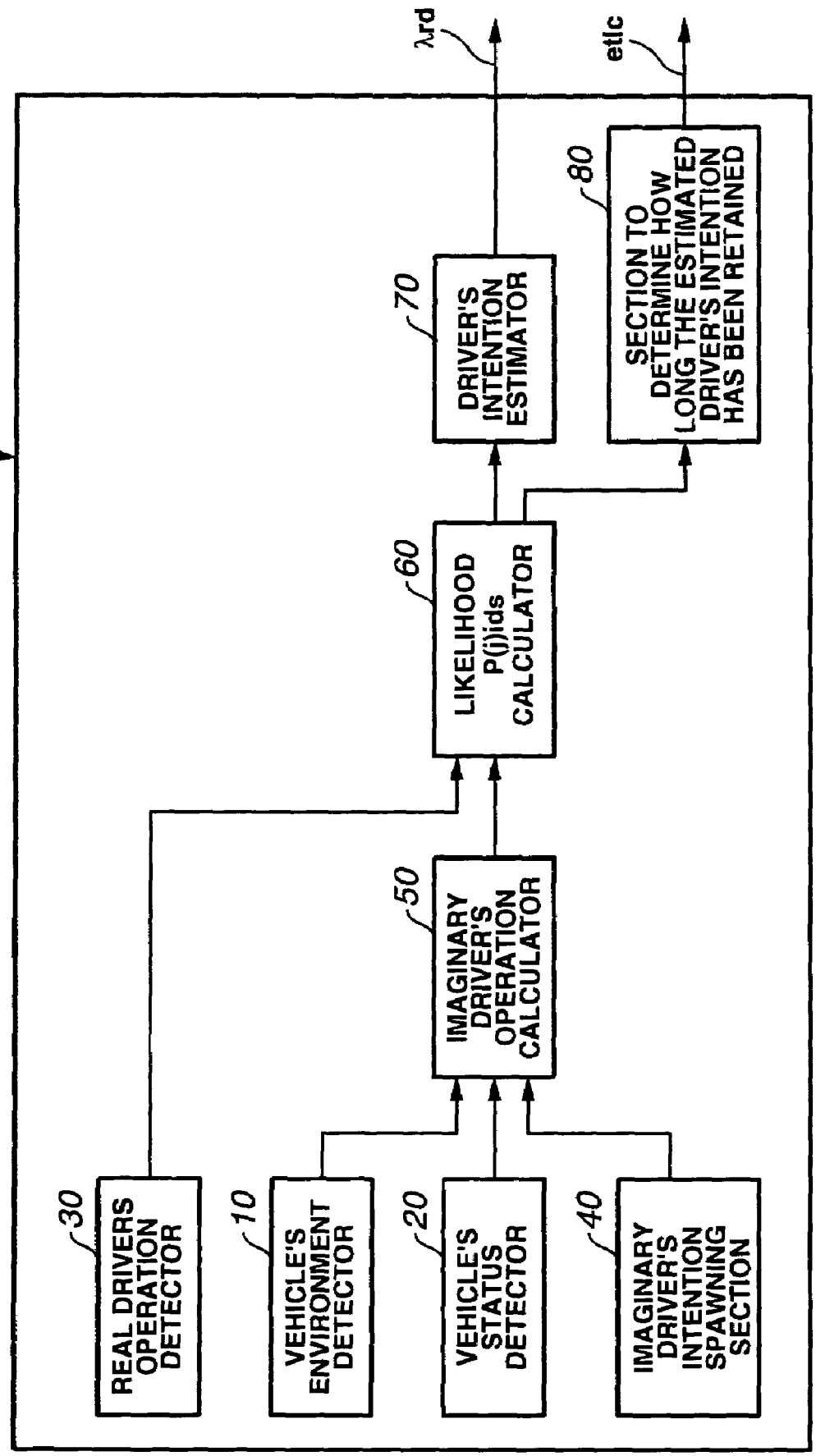
FIG. 1 is a block diagram illustrating an exemplary implementation of a driving assistance system according to the present disclosure.

Referring to FIG. 1, an exemplary system 1 according to this disclosure includes a vehicle's environment detector 10, a vehicle's status detector 20, a real driver's operation detector 30, an imaginary driver's intention generating section 40, an imaginary driver's operation calculator 50, a likelihood P(j)ids calculator 60, a driver's intention estimator 70, and a section 80 to determine a state of an estimated driver's intention, for instance, by determining how long the estimated driver's intention has been retained. The vehicle's environment detector 10 detects a state of environment within a field around the vehicle. The vehicle's status detector 20 detects an operation status of the vehicle. The real driver's operation detector 30 detects an operation amount of a real driver in driving the vehicle.

The driver's intention estimating system 1 has access to reference data, such as data related to a plurality of imaginary drivers. Each of the imaginary drivers is designed to perform an operation of the vehicle according to an associated intention. Examples of the intention may include a lane-keeping intention (LK), a lane-change intention to the right (LCR), and a lane-change intention to the left (LCL).

As will be described in detail in connection with FIGS. 4, 5(a), and 5(b), the imaginary driver's intention generating section 40 continuously generates a lane-keeping intention (LK) at every point in time to form a series of intention for a parent imaginary driver. Furthermore, the imaginary driver's intention generating section 40 generates data related to at least one additional imaginary driver based on the intention of the parent imaginary driver. In one embodiment, the imaginary driver's intention generating section 40 generates data related to two additional imaginary drivers, each has one of two derivative lane-change intentions (LCR) and (LCL) based on a lane-keeping intention (LK) of the parent imaginary driver at an immediately preceding pint in time. In another embodiment, the imaginary driver's intention generating section 80 applies special rules in generating series of intentions for the additional imaginary drivers.

The imaginary driver's intention generating section 40 allows a parent imaginary driver to retain a lane-keeping intention (LK) at every point in time. Further, at every point in time with the parent imaginary driver having a lane-keeping intention (LK), the imaginary driver's intention generating section 40 generates data related to two additional imaginary drivers having lane-change intentions to the right (LCR) and to the left (LCL), respectively, for the next point in time. In one embodiment, an additional imaginary driver generated at a specific point of time assumes at least some of the intentions for all points of time preceding the specific point in time, from the parent imaginary driver.

Furthermore, the imaginary driver's intention generating section 40 determines whether or not an imaginary driver retaining one of the derivative lane-change intentions to exist at the next point in time should be allowed to continue to exist, by applying one or more rules. For instance, an exemplary rule allows the parent imaginary driver to retain a lane-keeping intention (LK) at every point in time, and generates data related to two additional imaginary drivers having lane-change intentions (LCR) and (LCL), respectively, at the next point in time. According to another exemplary rule, an imaginary driver is allowed to retain a lane-change intention to the right (LCR) at the next point in time if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This is equally applicable to a lane-change intention to the left (LCL). Accordingly, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, an imaginary driver that has one of the derivative lane-change intentions (LCR) and (LCL), is allowed to retain the derivative lane-change intention at the next point in time upon determination that a lane change continues.

At any point in time, each of the imaginary drivers has an associated operation corresponding to an intention retained by that imaginary driver. The process for determining an operation associated with each intention is described below. The vehicle's environment detector 10 provides information on a state of environment around the vehicle to the imaginary driver's operation calculator 50. Examples of such information include a lateral distance y of the vehicle from a centerline within a lane, and a yaw angle ψ of the vehicle with respect a line parallel to the centerline. The vehicle's status detector 20 provides information on a status of the vehicle to the imaginary driver's operation calculator 50. Examples of such information include a vehicle speed of the vehicle and a steering angle of the vehicle.

The imaginary driver's operation calculator 50 calculates operation amounts Oid of the imaginary drivers in a manner that will be described in detail in connection with FIG. 3. In order to reduce the computation load, certain rules are applied to determine whether an existing additional imaginary driver retaining one of the derivative lane-change intentions should be allowed to exist at the next point. In other words, if a predetermined condition established by the rules is not met by an additional imaginary driver at a specific point in time, that additional imaginary driver is terminated or eliminated. Since it is not necessary to calculate operation amounts Oid of the eliminated imaginary drivers, the computation load is reduced.

The imaginary driver's operation calculator 50 provides the calculated operation amounts Oid of the imaginary drivers to the likelihood value P(j)ids calculator 60. For comparison with each of the calculated operation amounts Oid of the imaginary drivers, the real driver's operation detector 30 provides a detected operation amount Ord to the likelihood value P(j)ids calculator 60. An example of the operation amount to be detected is a steering angle of the vehicle.

The likelihood value P(j)ids calculator 60 calculates a likelihood value Pid(j)(t) of an imaginary driver, based on the associated operation amounts Oid and the detected operation amount Ord. The calculated likelihood values Pid(j)(t) are stored in data storage devices, such as memory or hard disk. For each imaginary driver, the data storage device stores the most recent likelihood value Pid(j)(t) after shifting the previously calculated likelihood value. The stored likelihood values may be represented in the form of Pid(j)(t), Pid(j)(t−1), . . . , Pid(j)(t−m+1), which correspond to likelihood values calculated at different points in time ranging from the present point in time (t) back to (t−m+1). The m (a natural number) points in time are arranged at regular intervals and define a predetermined period of time.

The likelihood value P(j)ids calculator 60 calculates a collective likelihood value P(j)ids for each imaginary driver j based on likelihood values Pid(j)(t), Pid(j)(t−1), . . . , Pid(j)(t−m+1) and provides the calculated series-likelihood values P(j)ids for processing at the driver's intention estimator 70.

In one embodiment, the driver's intention estimator 70 selects one of the imaginary drivers to approximate behaviors of the real driver based on the calculated collective likelihood values P(j)ids. An intention of the selected imaginary driver, such as the most recent intention retained by the selected imaginary driver, is set as an estimated driver's intention λrd of the real driver.

In order to determine a state of an estimated driver's intention λrd, section 80 is provided. Detailed operation of section 80 will be described later.

With continuing reference to FIG. 1 the vehicle's environment detector 10 includes a front camera that covers a field of front view and a yaw angle sensor. The front camera acquires images of road conditions, within the field of front view. The vehicle's environment detector 10 detects a lateral distance y of the vehicle from a centerline within a lane, and a yaw angle ψ of the vehicle with respect a line parallel to the centerline. The vehicle's environment detector 10 is equipped with an image processor that processes the acquired image. The vehicle's status detector 20 includes a vehicle speed sensor for detecting a speed of the vehicle. The real driver's operation detector 30 includes a sensor to detect an operation performed by the driver. Detector 30 may be a steering angle sensor that detects a steering angle of the vehicle. Other types of sensors can be used, such as acceleration sensor or brake sensor.

As shown in FIG. 1, the exemplary system 10 includes imaginary driver's intention generating section 40, imaginary driver's operation calculator 50, likelihood value P(j)ids calculator 60, driver's intention estimator 70, and section 80. Some or all of these elements are implemented using one or more microcomputers or microcontrollers, such as a central processor unit (CPU), executing microcode, software programs and/or instructions. The microcode and/or software reside in volatile and/or non-volatile data storage devices and/or machine-readable data storage medium such as read only memory (ROM) devices, random access memory (RAM) devices, SRAM, PROM, EPROM, CD-ROM, disks, carrier waves, etc.

As described before, the imaginary driver's intention generating section 40 continuously generates data related to imaginary drivers. Each of the imaginary drivers retains a series of intentions over a period of time. The number of the imaginary drivers and types of intentions retained by the imaginary drivers are dynamic, and may change over time.

As described before, the imaginary driver's operation calculator 50 calculates operation amounts Oid of the imaginary drivers associated with different intentions that are determined by the imaginary driver's intention generating section 40.

Figure 2:
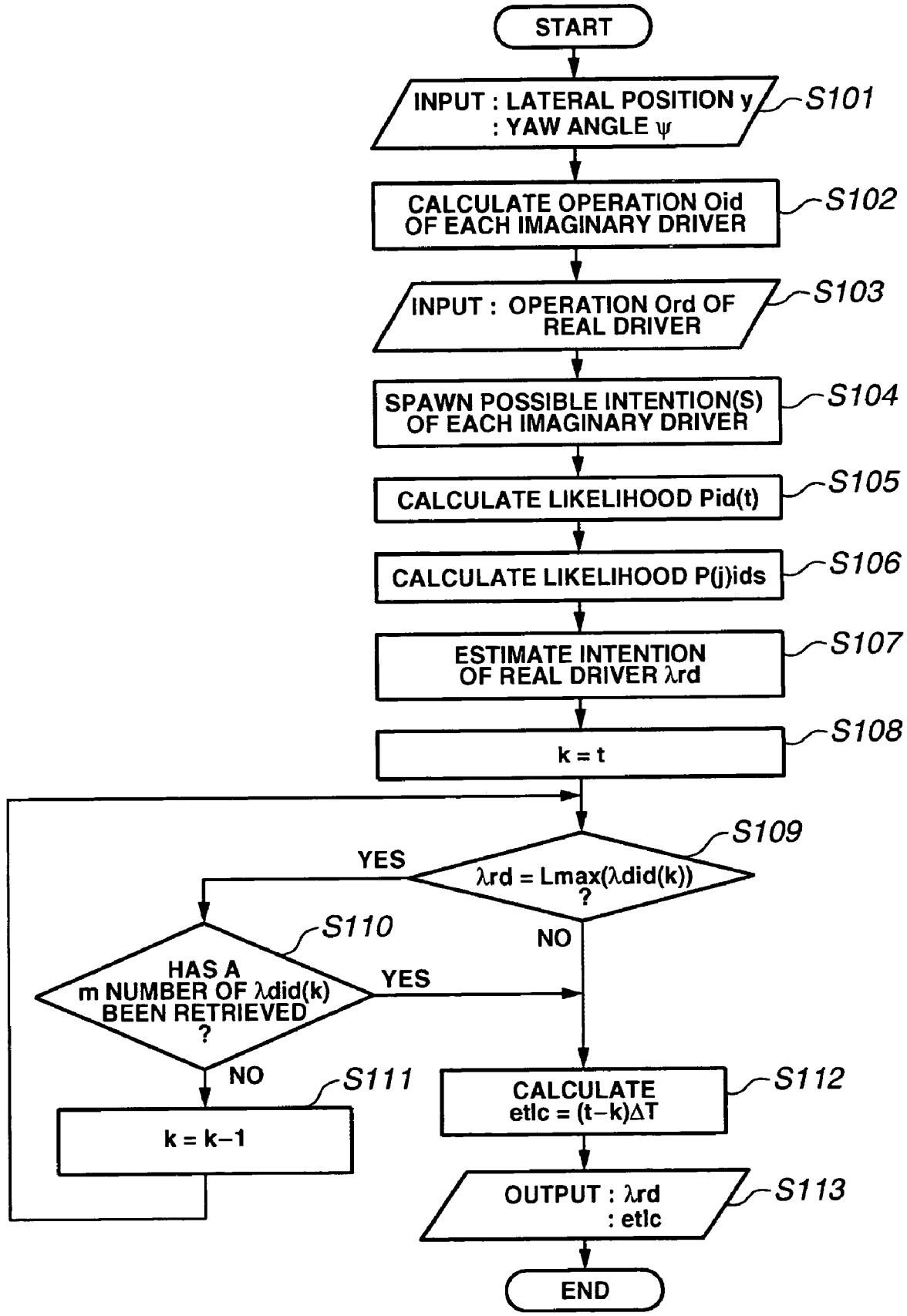
FIG. 2 is a flow chart illustrating the operation of the driving assistance system illustrated in FIG. 1.
Figure 3:
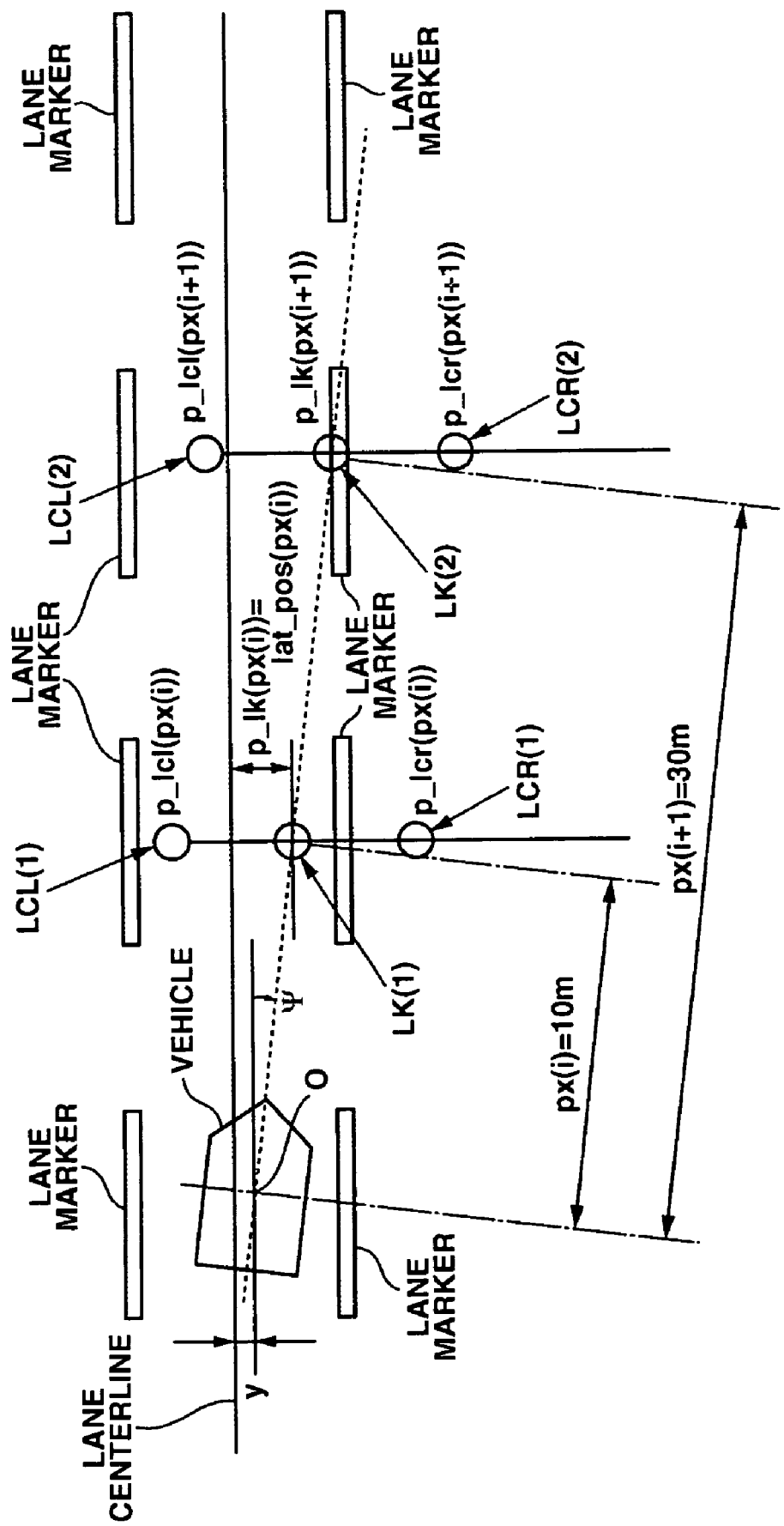
FIG. 3 illustrates calculations of an operation amount for an imaginary driver.

Referring to FIGS. 2 and 3, the operation of the exemplary system 1 is explained. The flow chart in FIG. 2 illustrates the operation of a driver's intention estimation processing program. Execution of this program is repeated at a regular interval of ΔT, for example, ΔT=50 milliseconds.

At step S101, the microcomputer reads in data related to a lateral position y of the vehicle within a lane (or track) and a yaw angle ψ of the vehicle. As shown in FIG. 3, the lateral position y is a distance of a center O of the vehicle from the centerline of the lane, and the yaw angle ψ is an angle through which the vehicle is turned relative to a specific reference, such as a line parallel to the centerline of the lane.

At step S102, the microcomputer calculates an operation Oid of each of a plurality of imaginary drivers. In this example, the plurality of imaginary drivers are variable in number and includes an imaginary driver A designed to behave as directed by the latest intention of a series of a lane-keeping intention (LK). The remaining of the plurality of imaginary drivers consists of at least one imaginary driver B designed to behave as directed by a lane-change intention to the right (LCR), and at least one imaginary driver C designed to behave as directed by a lane-change intention to the left (LCL). The microcomputer calculates an operation amount Oid, by which each of these three imaginary drivers A, B and C would operate a vehicle control device, such as a steering wheel or an acceleration pedal, in driving the vehicle as directed by the intention. In the exemplary implementation, the vehicle control device is a steering system of the vehicle. In this case, the operation amount Oid is a steering angle θid. The microcomputer calculates a steering angle θid, which each of the three imaginary drivers A, B and C would perform to manipulate a steering wheel in driving the vehicle as directed by the intention. The following descriptions describe how a steering angle θid associated with an imaginary driver is calculated.

(1) Imaginary Driver A Having a Lane-keeping Intention (LK):

Steering angle θid.lk represents an angle that an imaginary driver A having a lane-keeping intention (LK) would manipulate a steering wheel in driving the vehicle. The microcomputer sets at least one reference point LK(i) in front on a longitudinal centerline of the vehicle at a distance px(i) from the center O of the vehicle, and calculates a lateral position p_lk(px(i)) of the reference point LK(i) from a centerline of a lane. At least one reference point LK(i) includes any desired number of reference points LK(i). In this example, as shown in FIG. 3, two reference points LK(1) and LK(2) are set on the longitudinal centerline of the vehicle at different distances px(1) and px(2) from the center O of the vehicle, wherein the distance px(1)=10 m and the distance px(2)=30 m. The distance px(i) may vary with different vehicle speeds.

A lateral distance lat_pos(px(i)) of the reference point LK(i) from the centerline of the lane is dependent on, and is thus determined by, the yaw angle ψ and the distance px(i), which may be determined, for example, by processing the acquired image from the front camera. Thus, the lateral position p_lk(px(i)) of the reference point LK(i) may be expressed as:

$$p\_lk(px(i)) = \text{lat\_pos}(px(i)) \quad i=\{1,\ldots,n\} \quad \text{(Eq. 1)}$$

The number n is equal to 2 (n=2) in the example shown in FIG. 3.

Using the lateral position p_lk(px(i)), the steering angle $\theta id_{13}lk$ may be expressed as:

$$\theta id\_lk = \Sigma\{a(i) \cdot p\_lk(px(i))\} \quad \text{(Eq. 2)}$$

where: a(i) is an appropriately determined coefficient weighting the lateral position p_lk(px(i)), and is determined based on characteristics of vehicles, such as the gear ratio of a vehicle implementing the system disclosed herein.

(2) Imaginary Driver B Having a Lane-change Intention to the Right (LCR):

Steering angle θid_lcr represents an angle that an imaginary driver B having a lane-change intention to the right (LCR) would manipulate a steering wheel in driving the vehicle as directed by the lane-change intention to the right (LCR). The microcomputer sets at least one reference point LCR(i) which may include any desired number of reference points LCR(i). In the example shown in FIG. 3, two reference points LCR(1) and LCR(2) are set.

A lateral position p_lcr(px(i)) of the reference point LCR(i) may be given as a sum of lat_pos(px(i)) and a predetermined offset lc_offset_lcr. Lateral position p_lcr(px(i)) can be expressed as:

$$p\_lcr(px(i)) = \text{lat\_pos}(px(i)) + lc\_\text{offset}\_lcr \quad i=\{1,\ldots,n\} \quad \text{(Eq. 3)}$$

The number n is equal to 2 (n=2) in the example shown in FIG. 3. The predetermined offset lc_offset_lcr is an appropriately determined value for giving the lateral position p_lcr(px(i)) of the reference point LCR(i). In this example, the offset lc_offset_lcr is equal to −1.75 (lc_offset_lcr=−1.75).

Using the lateral position p_lcr(px(i)), the steering angle θid_lcr may be expressed as:

$$\theta id\_lcr = \Sigma\{a(i) \cdot p\_lcr(px(i))\} \quad \text{(Eq. 4)}$$

where: a(i) is an appropriately determined coefficient weighting the lateral position p_lcr(px(i)), and is determined based on characteristics of vehicles, such as the gear ratio of a vehicle implementing the system disclosed herein.

(3) Imaginary Driver C Having a Lane-change Intention to the Left (LCL):

Steering angle θid_lcl represents an angle by which an imaginary driver C having a lane-change intention to the left (LCR) would manipulate a steering wheel in driving the vehicle as directed by the lane-change intention to the left (LCR). The microcomputer sets at least one reference point LCL(i) which may include any desired number of reference points LCL(i). In the example shown in FIG. 3, two reference points LCL(1) and LCL(2) are set.

A lateral position p_lcl(px(i)) of the reference point LCL(i) may be given by a sum of lat_pos(px(i)) and a predetermined offset lc_offset_lcl, and thus expressed as:

$$p\_lcl(px(i)) = \text{lat\_pos}(px(i)) + lc\_\text{offset}\_lcl \quad i=\{1,\ldots,n\} \quad \text{(Eq. 5)}$$

The number n is equal to 2 (n=2) in the example shown in FIG. 3. The predetermined offset lc_offset_lcl is an appropriately determined value for giving the lateral position p_lcl(px(i)) of the reference point LCL(i). In this example, the offset lc_offset_lcl is equal to 1.75 (lc_offset_lcr=1.75).

Using the lateral position p_lcl(px(i)), the steering angle θid_lcl may be expressed as:

$$\theta id\_lcl = \Sigma\{a(i) \cdot p\_lcl(px(i))\} \quad \text{(Eq. 6)}$$

where: a(i) is an appropriately determined coefficient weighting the lateral position p_lcl(px(i)), and is determined based on characteristics of vehicles, such as the gear ratio of a vehicle implementing the system disclosed herein.

After calculating the operation amount Oid of each of the imaginary drivers A, B and C at step S102, the logic goes to step S103. At step S103, the microcomputer receives, as an input, an operation amount Ord of a real driver by, in this exemplary implementation, reading in a steering angle θrd detected by the real driver's operation detector 30.

At the next step S104, the microcomputer forms a series of intentions for each of the plurality of imaginary drivers. The types of intentions and the number of the imaginary drivers may change over time. The microcomputer has memory portions for storing the intentions. Each of the memory portions is designed to store m, in number, intentions over a period of time ranging from time (t) back to time (t−m+1). Except for a special memory portion, the microcomputer resets any one of the remaining memory portions upon determination that the memory portion has contained m, in number, intentions of the same kind.

Figure 4:
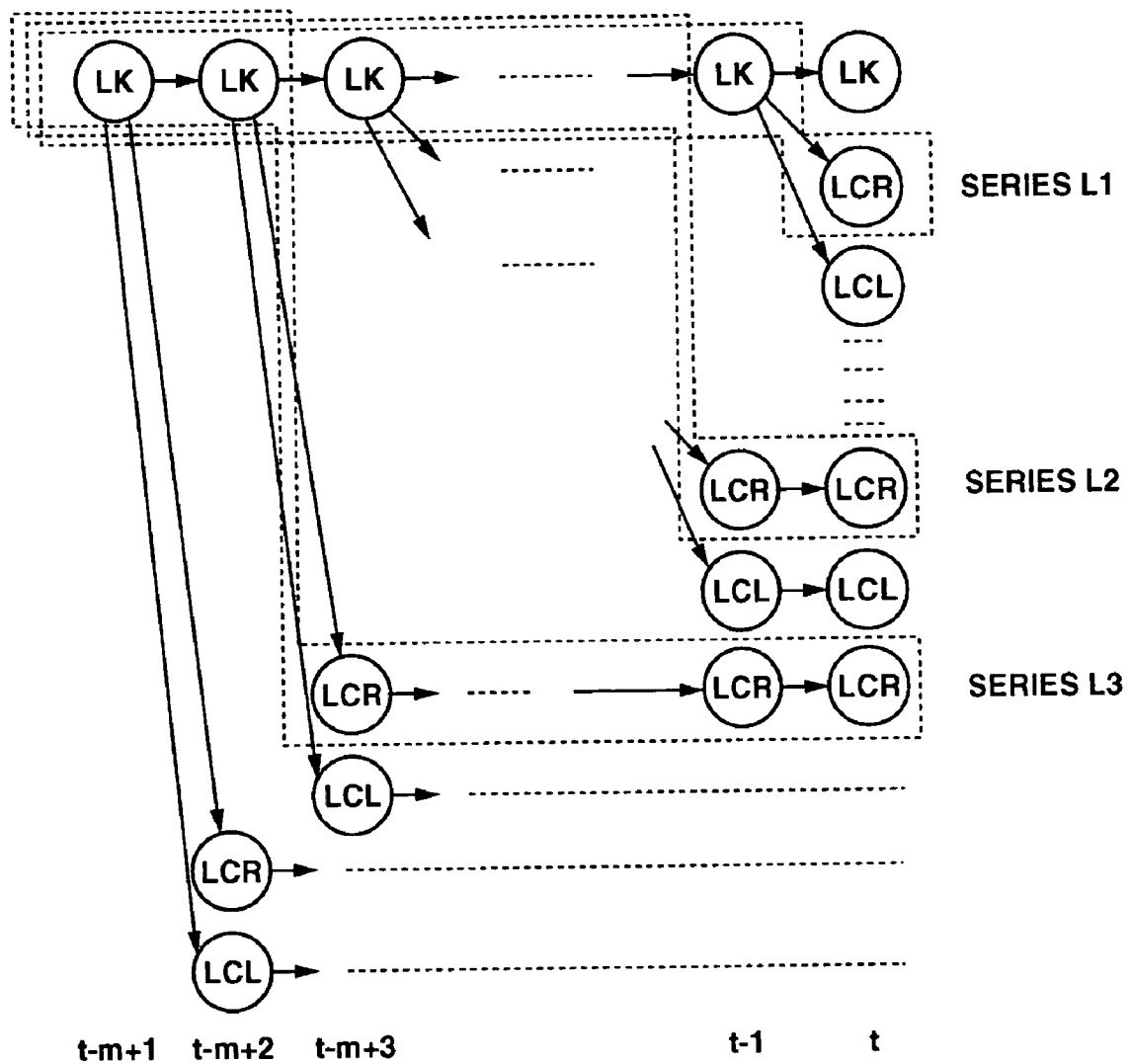
FIG. 4 is an exemplary illustration of generating a series of lane-keeping intentions retained by a parent imaginary driver and derivative lane-change intentions retained by additional imaginary drivers.

FIG. 4 illustrates data related to a plurality of imaginary drivers generated by the microcomputer. Each imaginary driver retains a series of intentions over, m, in number, points in time ranging from time (t) back to time (t−m+1). Referring to FIG. 4, the microcomputer continuously generates a lane-keeping intention (LK) at every point in time. The lane-keeping intentions form a series of intentions for a parent imaginary driver.

Furthermore, the microcomputer generates data related to at least one additional imaginary driver based on the intention of the parent imaginary driver. In the example shown in FIG. 5(a), the microcomputer generates data related to two additional imaginary drivers, each has one of two derivative lane-change intentions (LCR) and (LCL) based on a lane-keeping intention (LK) of the parent imaginary driver at an immediately preceding pint in time. In addition, the two additional imaginary drivers generated at a specific point of time assumes at least some of the intentions for all points in time preceding the specific point in time, from the parent imaginary driver.

Figure 5A:
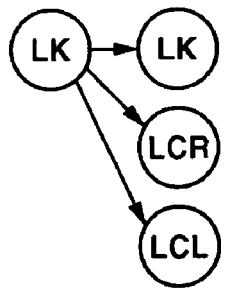
FIG. 5(a) shows a rule for applying to the generation of data related to imaginary drivers as illustrated in FIG. 4.

Referring also to FIG. 5(a), the microcomputer applies certain rules in generating series of intentions for existing additional imaginary drivers. For instance, the microcomputer determines whether an imaginary driver retaining one of the derivative lane-change intentions may continue to exist at the next point in time, by applying one or more rules. An exemplary rule allows the parent imaginary driver to retain a lane-keeping intention (LK) at every point in time, and generates data related to two additional imaginary drivers having lane-change intentions (LCR) and (LCL), respectively, at the next point in time. According to another exemplary rule, an imaginary driver is allowed to retain a lane-change intention to the right (LCR) at the next point in time if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This is equally applicable to a lane-change intention to the left (LCL). Accordingly, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, an imaginary driver that has one of the derivative lane-change intentions (LCR) and (LCL), is allowed to retain the derivative lane-change intention at the next point in time upon determination that a lane change continues.

As described above, a special memory portion is provided for storing intentions of the parent imaginary driver. The intentions include m, in number, lane-keeping intentions (LK), over a period of time ranging from time (t) back to time (t−m+1). Each of the remaining memory portions is provided for storing intentions for one of the additional imaginary drivers. The intentions include lane-change intention (LCR) or (LCL) over a period of time ranging from time (t) back to time (t−m+1). It is now apparent that, except for the special memory portion provided for the parent imaginary driver, the microcomputer resets any memory portions for the additional imaginary drivers upon determination that the memory portion has contained m, in number, lane-change intentions.

Referring to FIG. 4, "SERIES L1" corresponds to a series of intentions of an additional imaginary driver that is generated at time t, and includes a lane-change intention to the right (LCR) at time t. "SERIES L2" includes two lane-change intentions to the right and represents intentions of another additional imaginary driver generated earlier. "SERIES L3" including (m−3), in number, lane-change intentions to the right (LCR) and represents intentions of still another imaginary driver that is generated earlier than "SERIES L1" and "SERIES L2.".

The imaginary driver corresponding to "SERIES L1" retains a lane-keeping intention (LK) at every point in time from (t−m+1) to (t−1), and has a lane-change intention to the right (LCR) at the present point in time (t). The imaginary driver corresponding to "SERIES L2" retains a lane-keeping intention (LK) from (t−m+1) to (t−2), and has a lane-change intention to the right (LCR) at both (t−1) and (t). The imaginary driver corresponding to "SERIES L3" retains a lane-keeping intention (LK) from (t−m+1) to (t−m+2), and a lane-change intention to the right (LCR) at (t−m+3) through (t).

Figure 5B:
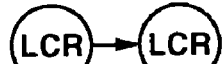
FIG. 5(b) is an illustration of another rule for applying to the generation of data related to imaginary drivers as illustrated in FIG. 4.

FIGS. 5(a) and 5(b) show rules that the imaginary driver's intention generating section 40 (as shown in FIG. 1) utilizes in determining an intention for each existing driver at each point in time. As mentioned before, the microcomputer allows a parent imaginary driver having a lane-keeping intention (LK) at every point in time. As shown in FIG. 5(a), the microcomputer generates data related to two additional imaginary drivers, each has one of two derivative lane-change intentions (LCR) and (LCL) based on a lane-keeping intention (LK) of the parent imaginary driver at an immediately preceding pint in time.

At each point in time, the microcomputer determines whether or not the vehicle's environment allows a lane-change intention to continue to exist at the next point in time by applying certain rules. FIG. 5(b) shows an exemplary rule used by the microcomputer. As shown in FIG. 5(b), an imaginary driver is allowed to retain a lane-change intention to the right (LCR) at the next point in time, if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This is equally applicable to a lane-change intention to the left (LCL). Accordingly, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, an imaginary driver that has one of the derivative lane-change intentions (LCR) and (LCL), is allowed to retain the derivative lane-change intention at the next point in time upon determination that a lane change continues.

In the exemplary implementation, on one hand, the microcomputer determines that the lane-change intention may continue to exist if the vehicle continues to stay in the same lane. On the other hand, the microcomputer determines that the lane-change intention has been realized if the vehicle has changed to a different lane. In other words, the microcomputer fails to determine that the lane-change intention continues. Thus, lane-change intentions (LCR) and (LCL) at a specific point in time are allowed to continue to exist at the next point in time upon determination that the vehicle continues to stay in the same lane. In contrast, lane-change intentions (LCR) and (LCL) are not allowed to continue to exist at the next point in time upon determination that the vehicle has changed to a different lane. As will be understood from the descriptions below, all imaginary drivers (except for the parent imaginary driver) that have at least one derivative lane-change intention (LCR) or (LCL)are terminated and reset upon determination that the vehicle has changed to a different lane.

At step S105, using the calculated operation amount Oid of each imaginary driver (calculated at step S102) and the detected operation amount Ord of the real driver (detected at step S103), the microcomputer calculates a likelihood value Pid indicating how the calculated operation amount Oid of each imaginary driver approximates the detected operation amount Ord of the real driver. For illustration purpose, the likelihood value Pid is used to represent a likelihood value Pid_lk of an imaginary driver having a lane-keeping intention (LK), a likelihood value Pid_lcr of an imaginary driver having a lane-change to the right (LCR), or a likelihood value Pid_lcl of an imaginary driver having a lane-change intention to the left (LCL). In the exemplary implementation, the calculated operation amount Oid of each imaginary driver is expressed by any one of the calculated steering angles θid_lk, θid_lcr, and θid_lcl. For illustration purpose, an imaginary driver's steering angle θid is used to represent any one of these calculated steering angles θid_lk, θid_lcr, and θid_lcl. In the exemplary implementation, the detected operation amount Ord of the real driver is expressed by the detected steering angle θrd performed by the real driver.

Many mathematical calculations can be used to compute the likelihood value Pid. For example, the likelihood value Pid of each imaginary driver is a logarithmic probability of a normalized value of the imaginary driver's steering angle θid relative to a normal distribution, where the mean (e) is the real driver's steering angle θrd and the variance (σ) is a predetermined value ρrd such as a standard deviation of steering angles. Generally, the value of ρrd depends on characteristics of the vehicle, such as the steering gear ratio, and/or the speed of the vehicle. ρrd may range from −15 degrees to +15 degrees, such as between 3 to 5 degrees. Of course, other values of ρrd may be used depending on the type and/or characteristics of vehicles.

The likelihood value Pid is expressed as:

$$Pid = \log\{Probn[(\theta id - \theta rd)/\rho rd]\} \quad \text{(Eq. 7)}$$

where Probn is a probability density function that is used to calculate a probability with which a given sample is observed from a population expressed by the normal distribution.

At step S105, using before-mentioned equation Eq. 7, the microcomputer calculates a likelihood value Pid(t) for each of the imaginary drivers of a dynamic family illustrated in FIG. 4. The calculated likelihood values are stored in the memory portions corresponding to each imaginary driver j, and are expressed as Pid(j)(t), where j corresponds to one of the imaginary drivers. Thus, Pid(j)(t) means a calculated likelihood value for an imaginary driver j having an intention at a point in time (t).

At step S106, using the stored likelihood values Pid(j)(t) ~Pid(j)(t−m+1), the microcomputer calculates a collective likelihood value P(j)ids for each imaginary driver j that is designed to behave as directed by intentions associated with each imaginary driver j. The collective likelihood value P(j)ids may be expressed as:

$$P(j)ids = \prod_{i=1}^{m} Pid(j)(t - i + 1) \quad \text{(Eq. 8)}$$

Equation 8 states that the collective likelihood value P(j)ids is the product of the respective calculated likelihood values Pid(j)(t)~Pid(j)(t−m+1).

At step S107, the microcomputer estimates a real driver's intention λrd. In this exemplary implementation, the microcomputer chooses one of the imaginary drivers that has the maximum calculated collective likelihood values P(j)ids among all imaginary drivers. The series of intentions corresponding to the chosen imaginary driver is now labeled Lmax. Then, the microcomputer chooses the latest intention of the series Lmax to approximate a real driver's intention λrd. The real driver's intention λrd may be expressed as:

$$\lambda rd = \max[Pid(Lmax)\_lk(t), Pid(Lmax)\_lcr(t), Pid(Lmax)\_lcl(t)] \quad \text{(Eq. 9)}$$

At step S108 and the succeeding steps, the microcomputer determines a state of the estimated real driver's intention λrd. If, for example, it is determined that the estimated real driver's intention λrd at the present point in time (t) is a lane-change intention to the right (LCR), a state of the estimated intention λrd is determined based on data related to the selected imaginary driver that is used to generate the estimated intention . For instance, the state of the estimated intention retained by the real driver may be defined as a period of time that the selected imaginary driver has retained the estimated intention.

Referring to FIG. 4, the period of time is the shortest if an imaginary driver corresponding to series "SERIES L1" is selected to approximate the real driver's intention at time t, wherein the imaginary driver has a lane-change intention to the right (LCR) only at time (t). The period of time is longer if an imaginary driver associated with series "SERIES L2" is selected to approximate the behaviors of the real driver.

Figure 6:
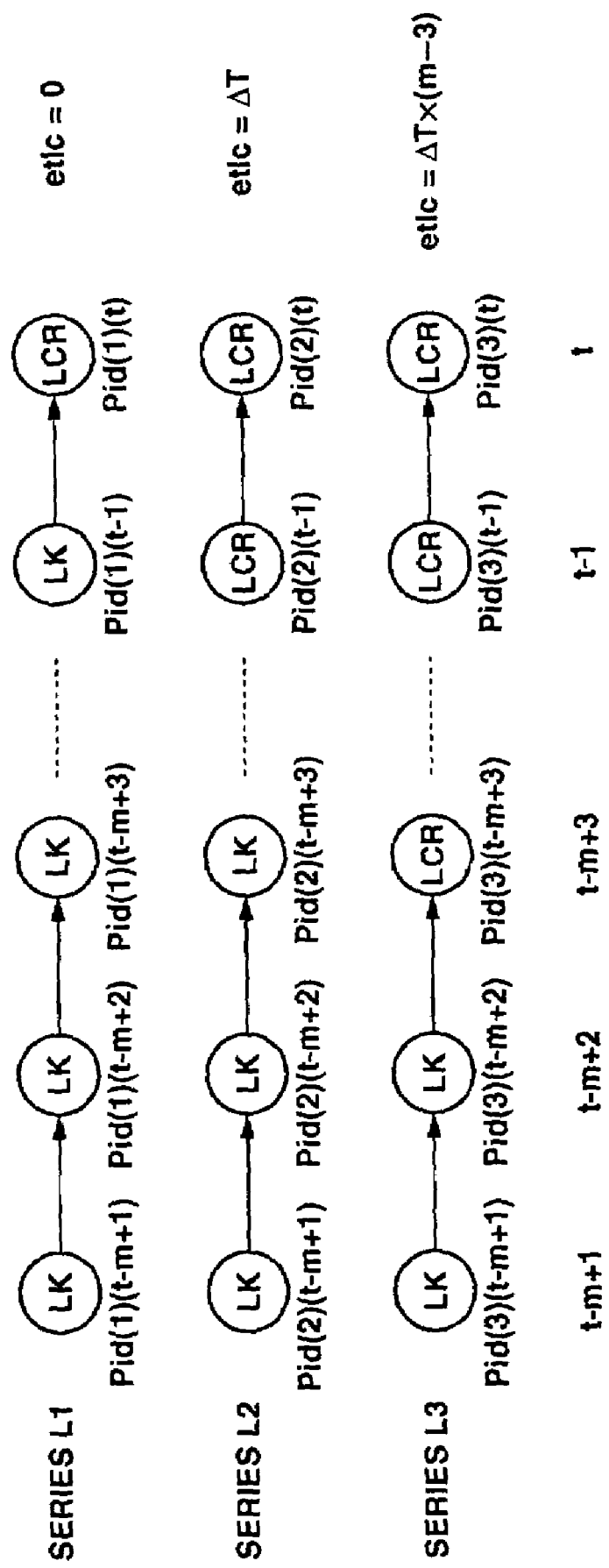
FIG. 6 is an exemplary illustration of the a first series of intentions (SERIES L1) corresponding to a first imaginary driver having a lane-change intention to the right (LCR), a second series of intentions (SERIES L2) corresponding to a second imaginary driver having a lane-change intention to the right (LCR), and a third series of intentions (SERIES L3) corresponding to a third imaginary driver having a lane-change intention to the right (LCR).

This selected imaginary driver retains a lane-change intention to the right (LCR) at both time (t) and (t−1). The period of time is the longest upon selection of an imaginary driver corresponding to series "SERIES L3" to approximate the behaviors of the real driver. The imaginary driver corresponding to "SERIES L3" has a lane-change intention to the right (LCR) at time (t−m+3) through (t). This period of time that the selected imaginary driver retains a specific intention is called elapsed time etlc. As readily seen from FIG. 6, the elapsed time etlc is 0 (etlc=0) upon selection of "SERIES L1", the elapsed time etlc is ΔT (etlc =ΔT=50 milliseconds) upon selection of "SERIES L2", and the elapsed time etlc is ΔT×(m−3) (etlc=ΔT×(m−3)) upon selection of "SERIES L3".

Thus, at step 108 and the succeeding steps, the microcomputer estimates the elapsed time etlc for determining the state of the estimated real driver's intention λrd.

At step 108, the microcomputer sets the present time t as a variable k (k=t) for retrieving contents, indicated by λdid(k). If an imaginary driver corresponding to "SERIES L3" is chosen for the series Lmax:

λdid(t) is indicative of an intention (LCR) at time (t) of the memory portion for the series "SERIES L3;

λdid(t−1) is indicative of an intention (LCR) at time (t−1) of the memory portion for the series "SERIES L3;

λdid(t−m+3) is indicative of an intention (LCR) at time (t−m+3) of the memory portion for the series "SERIES L3";

λdid(t−m+2) is indicative of an intention (LK) at time (t−m+2) of the memory portion for the series "SERIES L3"; and λdid(t−m+1) is indicative of an intention (LK) at time (t−m+2) of the memory portion for the series "SERIES L3.

At step S109, the microcomputer determines whether or not the estimated real driver's intention λrd is equal to λdid(k) of the series Lmax, which may be expressed as:

$$\lambda rd = Lmax(\lambda did(k)) \quad \text{(Eq. 10)}$$

If this is the case, the logic goes to step S110. At step S110, the microcomputer determines whether or not m, in number of, λdid(k) has been retrieved through the memory portion for the series Lmax. If this is not the case, the logic goes to step S111. At step S111, the microcomputer makes decrement of the variable k by decreasing the variable k by 1 (one). Step S111 allows the variable k to indicate the adjacent next preceding point in time.

If, at step S109, the microcomputer determines that the estimated real driver's intention λrd is not equal to λdid(k) of the memory portion for the series Lmax, the logic goes to step S112. For example, if λdid(t−m+2) is indicative of an intention (LK) at time (t−m+2) of "SERIES L3", the result of determination at step S109 becomes negative. In this case, the logic goes to step S112. In addition, the logic goes to S112 if the result of determination at step S110 becomes affirmative. The result of determination at step S110 becomes affirmative if all of locations of the memory portion for the series Lmax have been retrieved.

At step S112, the microcomputer calculates the elapsed time etlc, which may be expressed as:

$$etlc = (t-k) \times \Delta T \quad \text{(Eq. 11)}$$

where: ΔT is the time interval at which the execution of the program is repeated, which is indicative of a time between two adjacent points in time point in time, for example, (t) and (t−1).

After calculating the elapsed time etlc, the logic goes to step S113.

At step S113, the microcomputer provides, as an output, the estimated real driver's intention λrd and elapsed time etlc, which represents the state of the estimated intention.

The exemplary implementation described above provides effects as follows:

(1) With reference to FIG. 1, the functional block 40 labeled "imaginary driver's intention generating section" generates data of the dynamic family of imaginary drivers and associated intentions by retaining a parent driver having a lane-keeping intention (LK) existing at every point in time, and at every point in time with the parent imaginary driver having a lane-keeping intention (LK), generating data related to two additional imaginary drivers having lane-change intentions to the right (LCR) and to the left (LCL), respectively, for the next point in time. The functional block 60 labeled "likelihood value P(j)ids calculator" calculates a collective likelihood value P(j)ids based on present and past operation amounts Oid of each imaginary driver that is.designed to behave as directed by a series of intentions, and a series of detected operation amounts Ord of the real driver over the same period of time. The functional block 70 labeled "driver's intention estimator" estimates a real driver's intention λrd based on the collective likelihood value P(j)ids for each of the imaginary drivers. A state of the estimated real driver's intention λrd is calculated or estimated based on data of the imaginary driver selected to approximate the behaviors of the real driver.

(2) The functional block 80 estimates the elapsed time etlc starting from the point in time when the estimated intention was initially retained by an imaginary driver selected to approximate the behaviors of the real driver. The elapsed time etlc is defined as the state of the estimated real driver's intention λrd. Estimating the elapsed time etlc makes it possible to estimate how long the real driver retains the intention estimated.

(3) Estimating the elapsed time etlc from a point in time when the real driver first retains a lane-change intention makes it possible to know how determined the real driver is to change lanes. In the exemplary implementation, the elapsed time etlc is calculated for every estimated real driver's intention. According to another embodiment, the elapsed time is calculated only when the estimated real driver's intention is a lane-change intention.

In the descriptions above, steering angles θrd and θid are used as operations Ord and Oid of the real driver and the imaginary drivers. The same concept may be applied to different types of operations. For example, an accelerator pedal stroke may be used to indicate the operation performed or to be performed by the real driver and imaginary drivers. In this case, an accelerator pedal stroke Sid of an imaginary driver may be calculated based on a degree to which the vehicle has approached the preceding vehicle. This degree may be expressed by a distance to the preceding vehicle and time headway THW. A likelihood value of the accelerator pedal stroke Sid with respect to an accelerator pedal stroke Srd of a real driver is calculated for estimating a real driver's intention.

In the preceding description, two reference points are provided for one of the intentions as shown in FIG. 3. In application, any desired number of reference points may be provided.

Second Exemplary Implementation of the Disclosure

Figure 7:
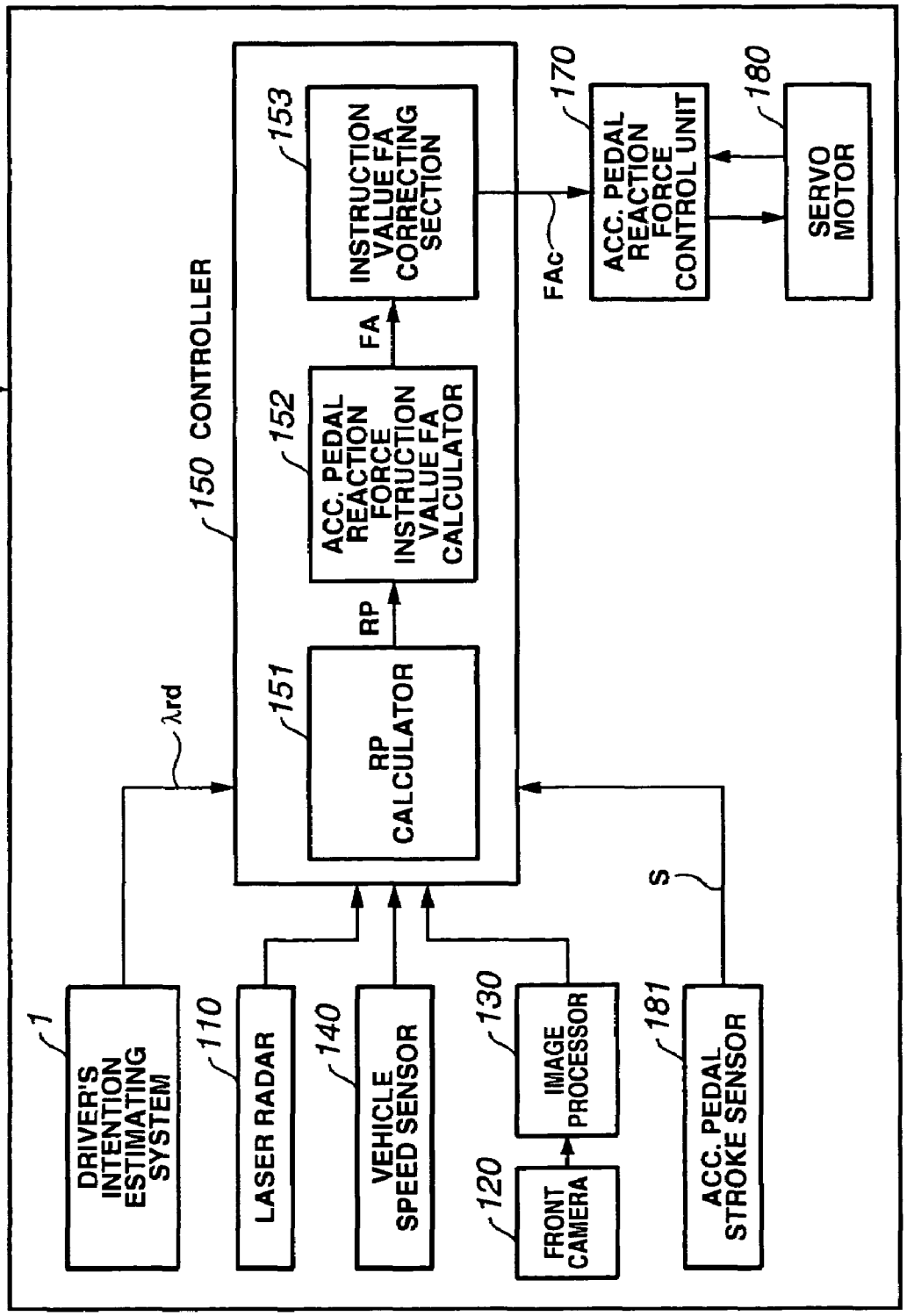
FIG. 7 is a block diagram illustrating another exemplary implementation of a driving assistance system according to the present disclosure.
Figure 8:
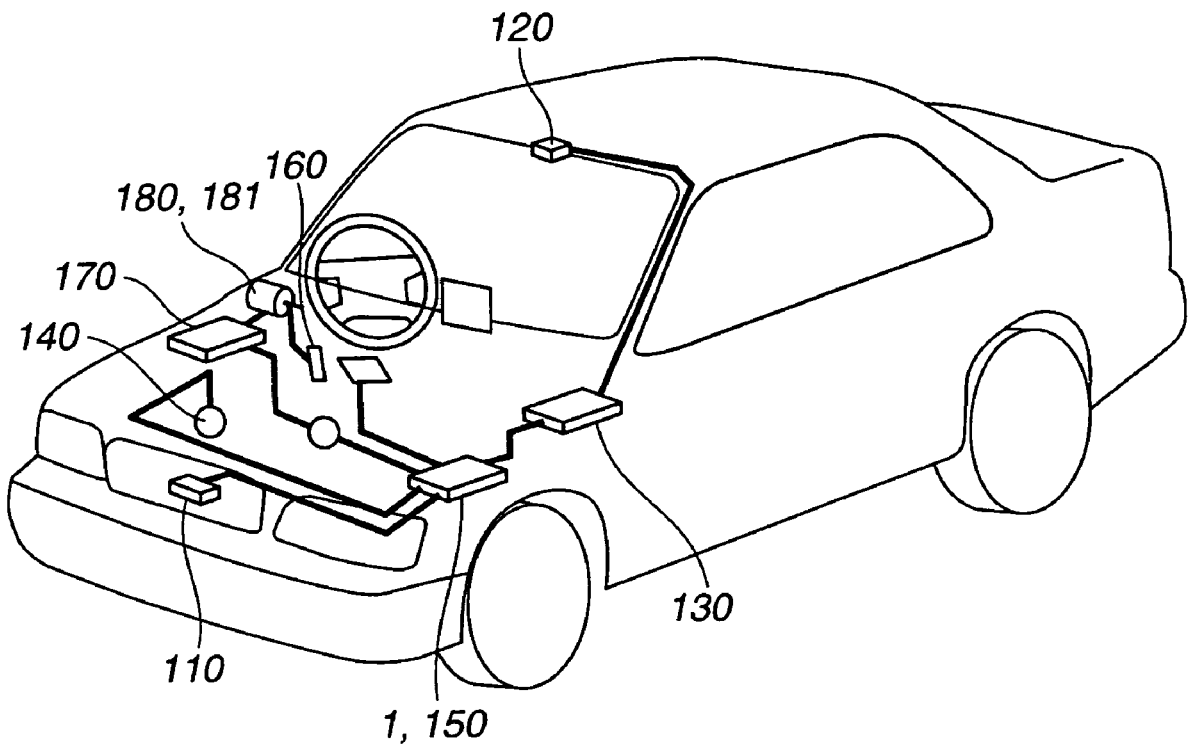
FIG. 8 is a perspective view of a vehicle in the form of a vehicle incorporating the driving assistance system described herein.
Figure 9:
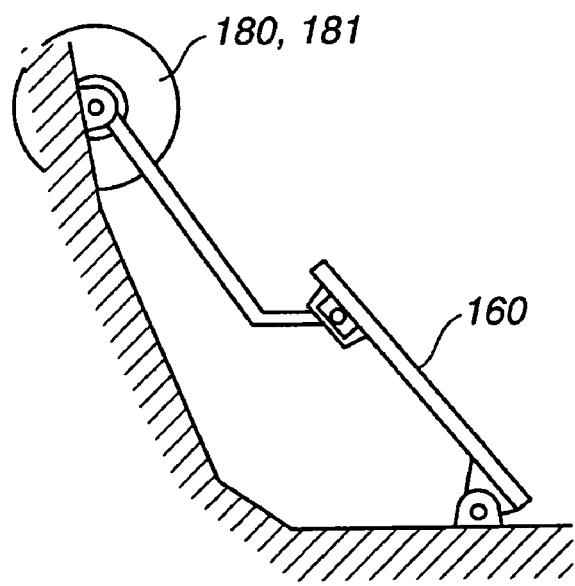
FIG. 9 is an illustration of an exemplary vehicle control device in the form of an accelerator pedal.

Referring to FIG. 7, another exemplary implementation of a driving assistance system 100 according to the present disclosure is described. As shown in FIG. 8, a vehicle is installed with the driving assistance system 100.

For better understanding of the driving assistance system, reference is made to US Published Patent Application No. 2003/0060936 Al, published Mar. 27, 2003, which is incorporated herein by reference in its entirety.

Referring to FIGS. 7 and 8, the driving assistance system 100 includes a laser radar 110. As shown in FIG. 8, the laser radar 110 is mounted to the vehicle at a front bumper or a front grille thereof. Laser radar 110 scans horizontally and laterally about 6 degrees to each side of an axis parallel to the vehicle longitudinal centerline, propagates infrared pulses forwardly and receives reflected radiation by an obstacle, such as a rear bumper of a preceding vehicle. The laser radar 110 can provide a distance d to a preceding vehicle and a relative speed Vr to the preceding vehicle. The laser radar 110 provides, as outputs, the detected distance d and relative speed Vr to a controller 150.

The driving assistance system 100 also includes a front camera 120. The front camera 120 is of the CCD type or CMOS type and mounted to the vehicle in FIG. 13 in the vicinity of the internal rear view mirror to acquire image data of a region in front of the vehicle. The front camera 120 provides, as output signals, the acquired image data to an image processor 130. The image processor 130 provides the processed image data to the controller 150. The region covered by the front camera 120 extends from the camera axis to each side by 30 degrees.

The driving assistance system 100 also includes a vehicle speed sensor 140. The vehicle speed sensor 140 determines a vehicle speed of the host vehicle by processing outputs from wheel speed sensors. The vehicle speed sensor 140 may include an engine controller or a transmission controller, which can provide a signal indicative of the vehicle speed. The vehicle speed sensor 140 provides, as an output, the vehicle speed of the host vehicle to the controller 150.

The driving assistance system 100 also includes system 1 as illustrated in FIGS. 1 to 6, to provide an estimated real driver's intention λrd and a state of the estimated intention, such as the elapsed time etlc, to the controller 150.

Controller 150, which performs data processing within the driving assistance system 100, may contain a microprocessor including as a central processing unit (CPU), a read only memory (ROM) and a random access memory (RAM). The controller 150 includes, for example, software implementation of a risk potential (RP) calculator 151, an accelerator pedal reaction force instruction value FA calculator 152, and an instruction value FA correcting section 153.

The RP calculator 151 calculates a risk potential (RP) associated with the vehicle based on a vehicle speed V1 of the host vehicle, a distance D to the preceding vehicle, and a relative speed Vr to the preceding vehicle, which are provided by the laser radar 110, vehicle speed sensor 140 and image processor 130. The RP calculator 151 provides, as an output, the risk potential RP to the accelerator pedal reaction force instruction value FA calculator 152.

The accelerator pedal reaction force instruction value FA calculator 152 calculates an accelerator pedal reaction force instruction value FA based on the risk potential RP. The accelerator pedal reaction force instruction value FA calculator 152 provides, as an output, the accelerator pedal reaction force instruction value FA to the instruction value FA correcting section 153.

The instruction value FA correcting section 153 corrects the accelerator pedal reaction force instruction value FA based on the estimated driver's intention λrd and the elapsed time etlc, and generates a corrected accelerator pedal reaction force instruction value FAc. The instruction value FA correcting section 153 provides, as an output, the corrected accelerator pedal reaction force instruction value FAc to an accelerator pedal reaction force control unit 170.

Figure 14:
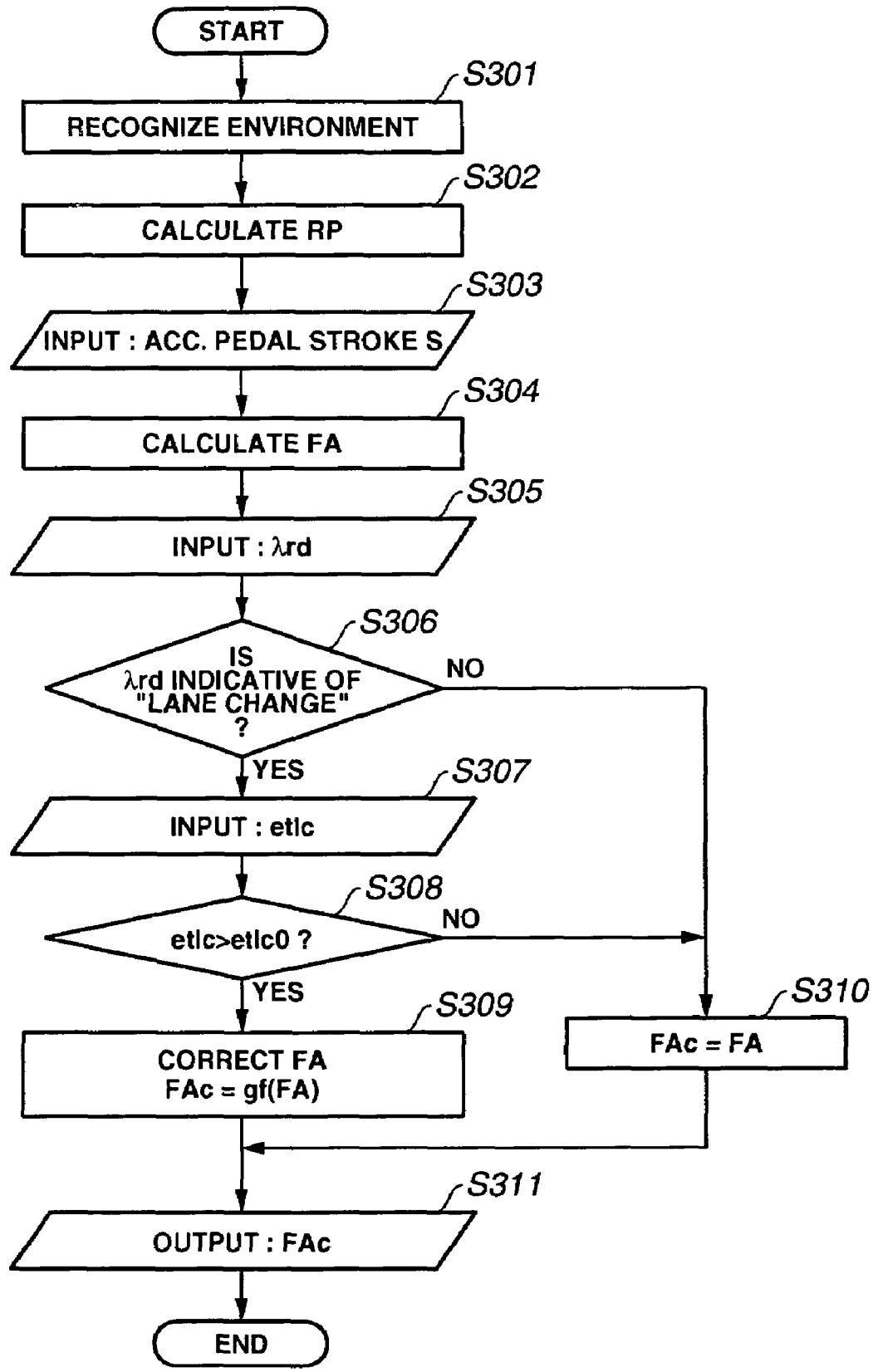
FIG. 14 is a flow chart showing the steps of the exemplary implementation illustrated in FIGS. 7 to 13(b).

In response to the corrected accelerator pedal reaction force instruction value FAc, the accelerator pedal reaction force control unit 170 regulates a servo motor 180 of an accelerator pedal 160. As shown in FIG. 14, the accelerator pedal 160 has a link mechanism including a servo motor 180 and an accelerator pedal stroke sensor 181. The servo motor 180 may provide any desired torque and any desired angular position in response to an instruction from the accelerator pedal reaction force control unit 170. The accelerator pedal stroke sensor 181 detects an accelerator pedal stroke or position S of the accelerator pedal 160 by measuring an angle of the servo motor 180. The angle of the servo motor 180 corresponds to the accelerator pedal stroke S because the servo motor 180 and the accelerator pedal 160 are interconnected by the link mechanism.

For better understanding of the accelerator pedal of the above kind, references are made to US Published Patent Applications Nos. 2003/0236608 A1(published Dec 25, 2003) and US 2003/0233902 A1 (published Dec. 25, 2003), both of which are incorporated herein by reference in their entireties.

When the accelerator pedal reaction force control unit 170 is not active, the reaction force increases linearly as the accelerator pedal stroke S increases. This reaction force varying characteristic is accomplished by a spring force provided by a torque spring arranged at the center of rotational movement of the accelerator pedal 160.

Figure 10:
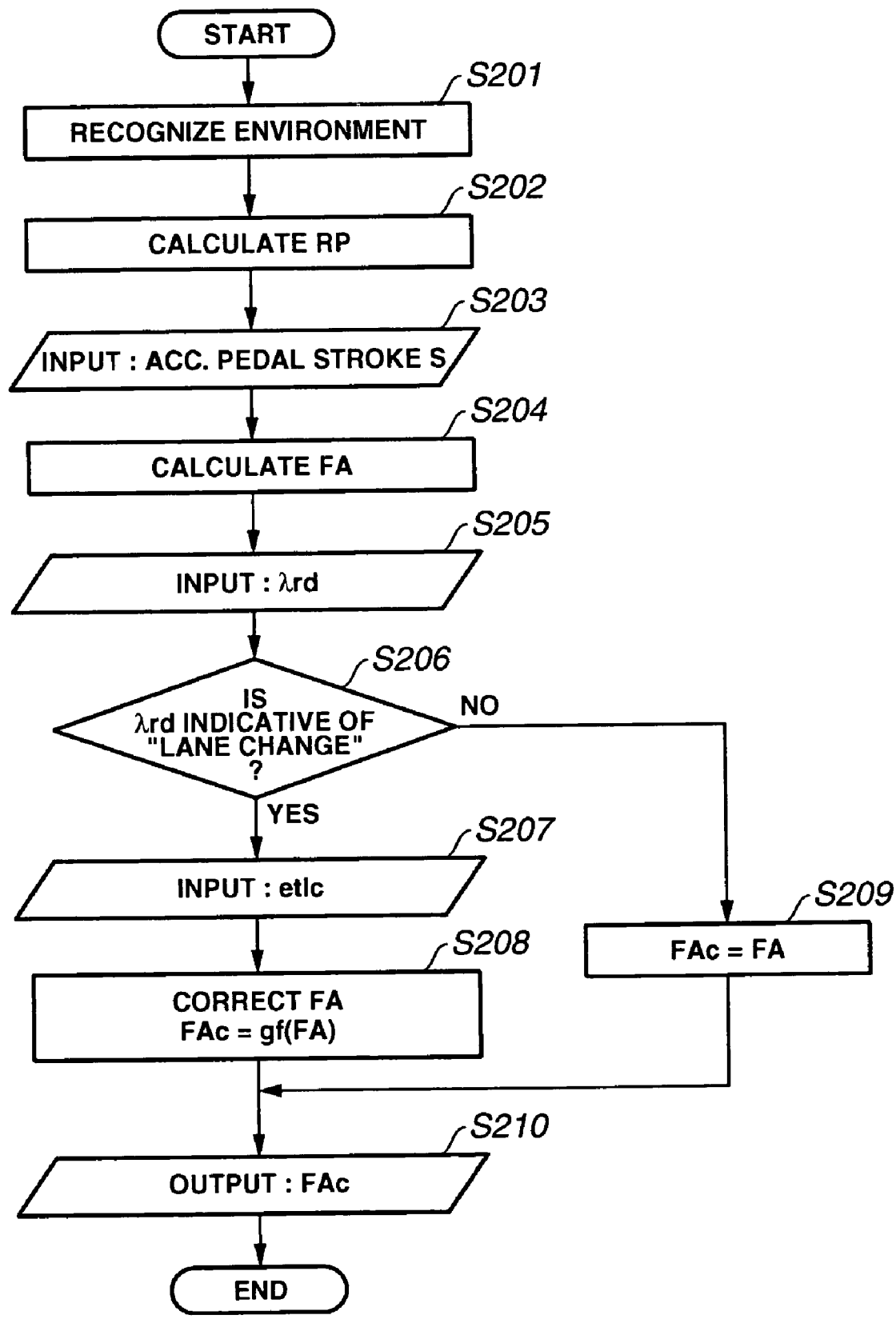
FIG. 10 is a flow chart illustrating operation of the driving assistance system illustrated in FIG. 7.

FIG. 10 shows a flow chart illustrating a control routine of a driving assistance control program stored in the controller 150. The execution of the control routine is repeated at regular interval of, for example, 50 msec.

In FIG. 10, at step S201, the controller 150 recognizes environment in a field around the host vehicle. In particular, the controller 150 receives, as inputs, signals of the laser radar 110, front camera 120 and vehicle speed sensor 140 by reading operations to acquire data regarding the vehicle's status and the vehicle's environment. For example, in imaging a traffic scene where the host vehicle is following the preceding vehicle, the acquired data include a vehicle speed V1 of the host vehicle, a vehicle speed V2 of the preceding vehicle, and a relative speed to the preceding vehicle Vr. The relative speed Vr may be expressed as Vr=V2−V1.

The acquired data may include a coordinate X1 of the host vehicle and a coordinate X2 of the preceding vehicle, and a distance D to the preceding vehicle. The distance D may be expressed as D=X2−X1.

At step S202, the controller 150 calculates a risk potential RP associated with the vehicle based on time to collision TTC and time headway THW, which are used as two exemplary notions to calculate the risk potential RP.

The TTC is an estimated period of time before the distance D becomes zero if the relative speed Vr to the preceding vehicle remains unchanged. The TTC may be expressed as:

$$TTC = -D/Vr \qquad \text{(Eq. 12)}$$

The smaller the value of TTC, the more imminent a collision is likely to occur. In the traffic scene where the host vehicle is following the preceding vehicle, most vehicle drivers perceive a high degree of risk and initiate deceleration to avoid collision well before the TTC becomes less than 4 seconds. To some extent, the TTC is a good indication for predicting future behaviors that the driver might take. However, when it comes to quantifying the degree of risk, which the vehicle driver actually perceives, the TTC alone is insufficient to quantify the degree of risk.

For instance, in a scenario in which the relative speed Vr is zero, the TTC is infinite irrespective of how narrow the distance D is. However, in reality, the driver perceives an increase in the degree of risk in response to a reduction in the distance D, accounting for an increase in influence on the TTC by an unpredictable drop in a vehicle speed of the preceding vehicle.

To address the above-mentioned discrepancy, the notion of time headway THW has been introduced to quantify an increase of an influence on TTC by an unpredictable drop in the vehicle speed of the preceding vehicle. THW is a period of time between the preceding vehicle reaching a specific location and the following vehicle arriving at the same location. THW is expressed as, $$THW = D/V1 \tag{Eq.13}$$

In the case where the host vehicle is following the preceding vehicle, the vehicle speed V2 of the preceding vehicle may be used instead of the vehicle speed V1 in Eq. 13.

The relationship between the two notions TTC and THW is such that a change in vehicle speed V2, if any, of the preceding vehicle will result in a small change in the TTC when the value of THW is large, but the same change in vehicle speed V2 of the preceding vehicle will result in a large change in the TTC when the value of THW is small.

In this exemplary implementation, the risk potential RP calculated at step S202 is expressed as a sum of a first index and a second index. The first index represents a degree that the vehicle has approached the preceding vehicle. The second index represents a degree that an unpredictable change in vehicle speed V2 of the preceding vehicle might have influence upon the vehicle. The first index may be expressed as a function of the reciprocal of time to collision TTC, and the second index may be expressed as a function of the reciprocal of time headway THW. The risk potential RP may be expressed as:

$$RP = a/THW + b/TTC \tag{Eq. 14}$$

where: b and a (b>a) are parameters weighting 1/TTC and 1/THW, respectively, such that 1/THW is less weighted than 1/TTC. The values of a and b are optimized after accounting for statistics of values of THW and TTC collected in a traffic scene including the host vehicle following the preceding vehicle. In this exemplary implementation, b=8 and a=1.

At step S203, the controller 150 receives, as an input, an accelerator pedal stroke S by reading operation of the output of the accelerator pedal stroke sensor 181.

At step S204, the controller 150 calculates an accelerator pedal reaction force instruction value FA. First, the controller 150 calculates a reaction force increment ΔF in response to the risk potential RP by, for example, referring to the characteristic curve shown in FIG. 11.

Figure 11:
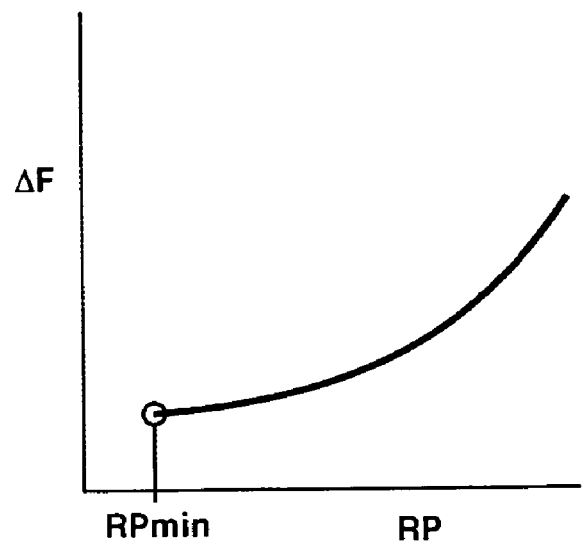
FIG. 11 illustrates of the relationship between a reaction force increment and different values of risk potential (RP).

The curve in FIG. 11 shows reaction force increment ΔF relative to different values of risk potential RP. When the risk potential RP is smaller than a minimum value RPmin, the reaction force increment ΔF is always zero in order to prevent forwarding unnecessary information to the driver. An appropriate value RPmin may be determined empirically.

When risk potential RP exceeds the minimum value RPmin, the reaction force increment ΔF increases exponentially as the risk potential RP increases. The reaction force increment ΔF within this region may be expressed as:

$$\Delta F = k \cdot RP^n \tag{Eq. 15}$$

where: k and n are constants that are appropriately determined based on results obtained by drive simulator and field drive to provide smooth conversion of the risk potential RP to the reaction force increment ΔF.

The controller 150 calculates the sum of the reaction force increment ΔF and the ordinary reaction force characteristic to provide the accelerator pedal reaction force instruction value FA.

At step S205, the controller 150 reads, as an input, the estimated real driver's intention λrd determined by system 1.

At step S206, the controller 150 determines whether or not the estimated driver's intention λrd is indicative of a lane-change intention. If this is the case, the logic goes to step S207.

At step S207, the controller 150 reads, as an input, the elapsed time etlc calculated by system 1.

At step S208, the controller 150 corrects the accelerator pedal reaction force instruction value FA to provide a corrected accelerator pedal reaction force instruction value FAc. In this exemplary implementation, the accelerator pedal reaction force instruction value FA is processed by a low-pass filter and decreased. In this case, the corrected accelerator pedal reaction force instruction value FAc may be expressed as:

$$FAc = gf(FA) = kf \cdot 1(1 + Tsf\,etlc) \cdot FA \tag{Eq. 16}$$

where: kf is an appropriately determined constant, and Tsf etlc is a time constant of the low-pass filter, which is determined as a function of the elapsed time etlc and may be expressed as:

$$Tsf\,etlc = f(etlc) \tag{Eq. 17}$$

Figure 12:
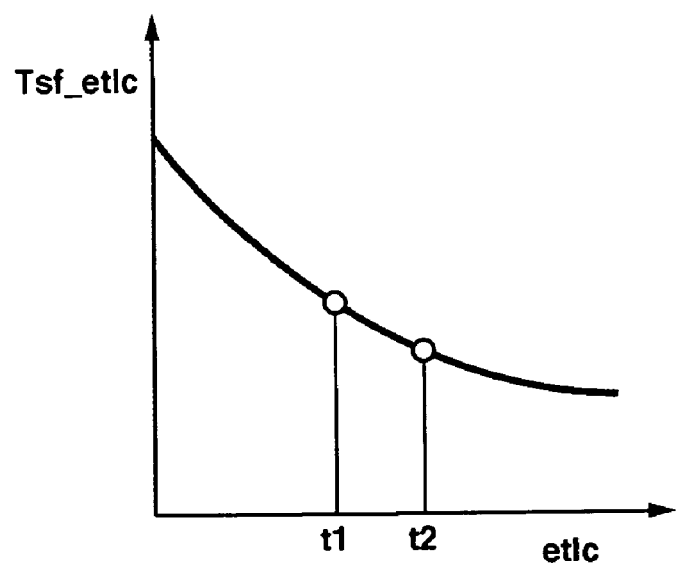
FIG. 12 illustrates characteristics of a time constant Tsf_etlc relative to different values of time etlc.

FIG. 12 illustrates characteristics of the function f(etlc). As illustrated in FIG. 12, the time constant Tsf etlc decreases as the elapsed time etlc increases, which allows a faster reduction of the accelerator pedal reaction force.

If, at step S206, the controller 150 determines that the estimated driver's intention λrd is indicative of a lane-keeping intention (LK), the logic goes to S209.

At step S209, the controller 150 sets the accelerator pedal reaction force instruction value FA as the corrected accelerator pedal reaction force instruction value FAc.

At the next step S210, the controller 150 provides, as an output, the corrected accelerator pedal reaction force instruction value FAc that has been determined at step S208 or S209 to the accelerator pedal reaction force control unit 170.

The accelerator pedal reaction force control unit 170 controls the servo motor 180 in response to the corrected accelerator pedal reaction force instruction value FAc.

Figures 13A, 13B:
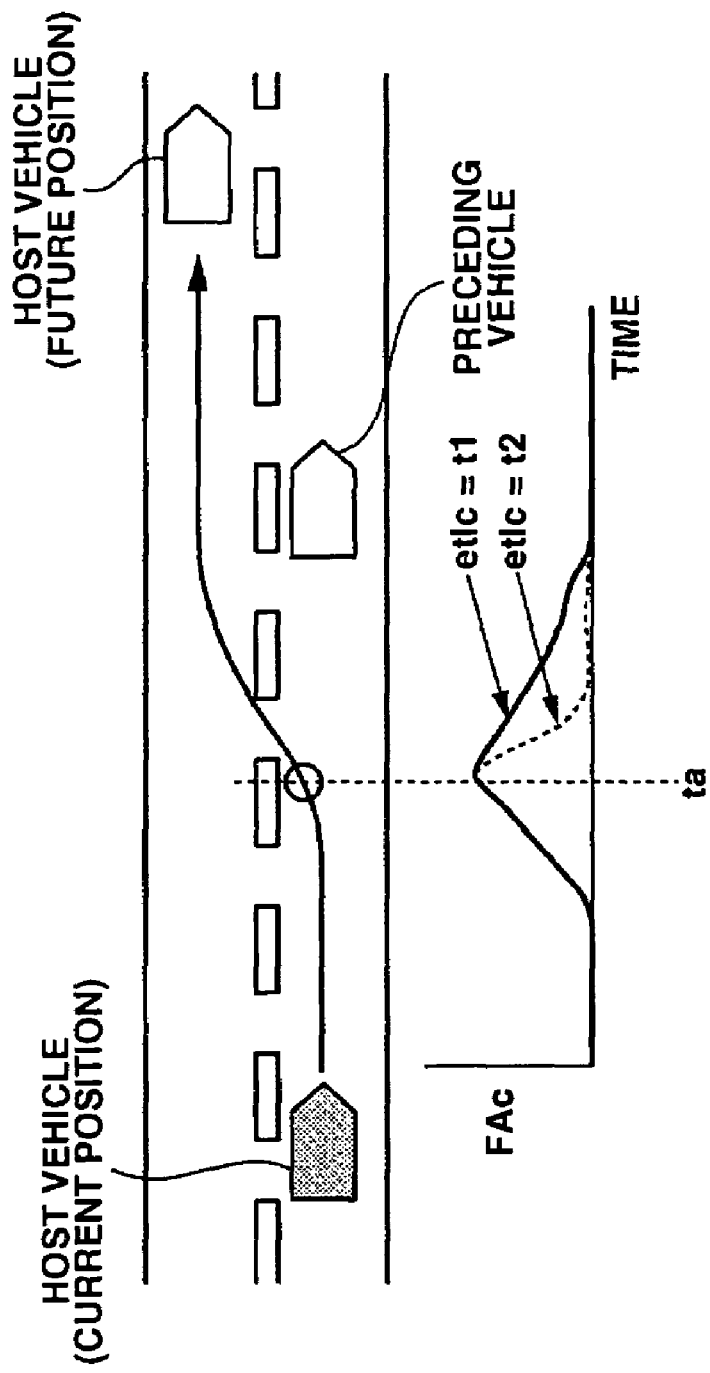
FIG. 13(a) shows a traffic scene in which a vehicle changes lanes to pass the preceding vehicle.
FIG. 13(b) illustrates a corrected accelerator pedal reaction force instruction value FAc in response to the estimated driver's lane-change intention.

Referring to FIGS. 13(a) and 13(b), the driving assistance system 100 is further described. FIG. 13(a) illustrates a traffic scene in which the host vehicle in changing lanes to pass the preceding vehicle. FIG. 13(b) illustrates two curves: L1 (in solid line) and L2 (in dotted line). L1 is a curve showing a corrected accelerator pedal reaction force instruction value FAc with elapsed time etlc equal to t1, and L2 is a curve showing a corrected accelerator pedal reaction force instruction value FAc with elapsed time etlc equal to t2, wherein t2 is larger than t1. As discussed earlier, elapsed time etlc is used to indicate a state of an estimated intention of the real driver. In other words, a driver represented by curve L2 retains a lane-changing intention longer a driver represented by curve L1.

As shown in FIG. 13(b), at time ta, upon determination that the estimated driver's intention λrd is indicative of a lane-change intention, the corrected accelerator pedal reaction force instruction value FAc controls the reaction force to drop dramatically to allow a smoother manipulation of the accelerator pedal 160 for the lane-change and the subsequent passing of the preceding vehicle. The corrected accelerator pedal reaction force instruction value FAc of curve L2 drops faster than that of curve L1 upon determination at time ta that the estimated driver's intention λrd is indicative of a lane-change intention. In other words, system 100 modifies the reaction force more dramatically upon determining that the real driver has a stronger intention (reflected by the long etlc t2) to change lanes.

This exemplary implementation has effects as follows:

(1) The controller 150 calculates the risk potential RP associated with the vehicle based on recognized environment surrounding the host vehicle, and regulates accelerator pedal reaction force based on the calculated risk potential RP. The controller 150 corrects the reaction force at the accelerator pedal 160 based on the estimated driver's intention λrd and the state of the estimated driver's intention.

(2) The controller 150 corrects an accelerator pedal reaction force applying to the accelerator pedal 160 in response to the elapsed time etlc when the estimated driver's intention λrd is indicative of a lane-change intention. This approach allows a smoother driver's manipulation of the accelerator pedal in changing lanes because the accelerator pedal reaction force is regulated to fit the driver's intention.

(3) The controller 150 is provided with the instruction value FA correcting section 153, which is operative to correct the relationship between the risk potential RP and the accelerator pedal reaction force. This functional block 153 lowers the accelerator pedal reaction force as the elapsed time etlc becomes longer. This allows a faster drop of the accelerator pedal reaction force to meet the driver's expectation after the driver has retained the lane-change intention for a long period of time.

Modification of the Second Exemplary Implementation

According to another embodiment of this disclosure, the accelerator pedal reaction force instruction value FA is corrected only when the elapsed time etlc is longer than a predetermined value etlc0. FIG. 14 shows a flow chart illustrating a control routine of a driving assistance control program stored in the controller 150. The execution of the control routine is repeated at a regular interval of, for example, 50 msec. The flow chart illustrated in FIG. 14 has steps S301 and 307, which are comparable to steps S201 and S207 of the flow chart illustrated in FIG. 10. Thus, the controller 150 performs substantially the same tasks down to step S307.

In FIG. 14, at step S308, the controller 150 determines whether or not the elapsed time etlc is longer than the predetermined value etlc0. If, at step S308, the controller 150 determines that the elapsed time etlc is longer than the predetermined value etlc0, the logic goes to step S309.

At step S309, the controller 150 corrects an accelerator pedal reaction force instruction value FA, which has been calculated at step S304, based on the elapsed time etlc. Specifically, the controller 150 corrects the accelerator pedal reaction force FA by calculating the following equation to provide a corrected accelerator pedal reaction force instruction value FAc.

$$FAc = gf(FA) = kf \cdot \{1/(1+Ksf \times Tsf\ etlc)\} \cdot FA \quad \text{(Eq. 18)}$$

where: kf is an appropriately determined constant, Tsf etlc is a time constant of the low-pass filter, and Ksf is a coefficient, which is a function of the elapsed time etlc and may be expressed as:

$$Ksf = f(etlc) \quad \text{(Eq. 19)}$$

Figure 15:
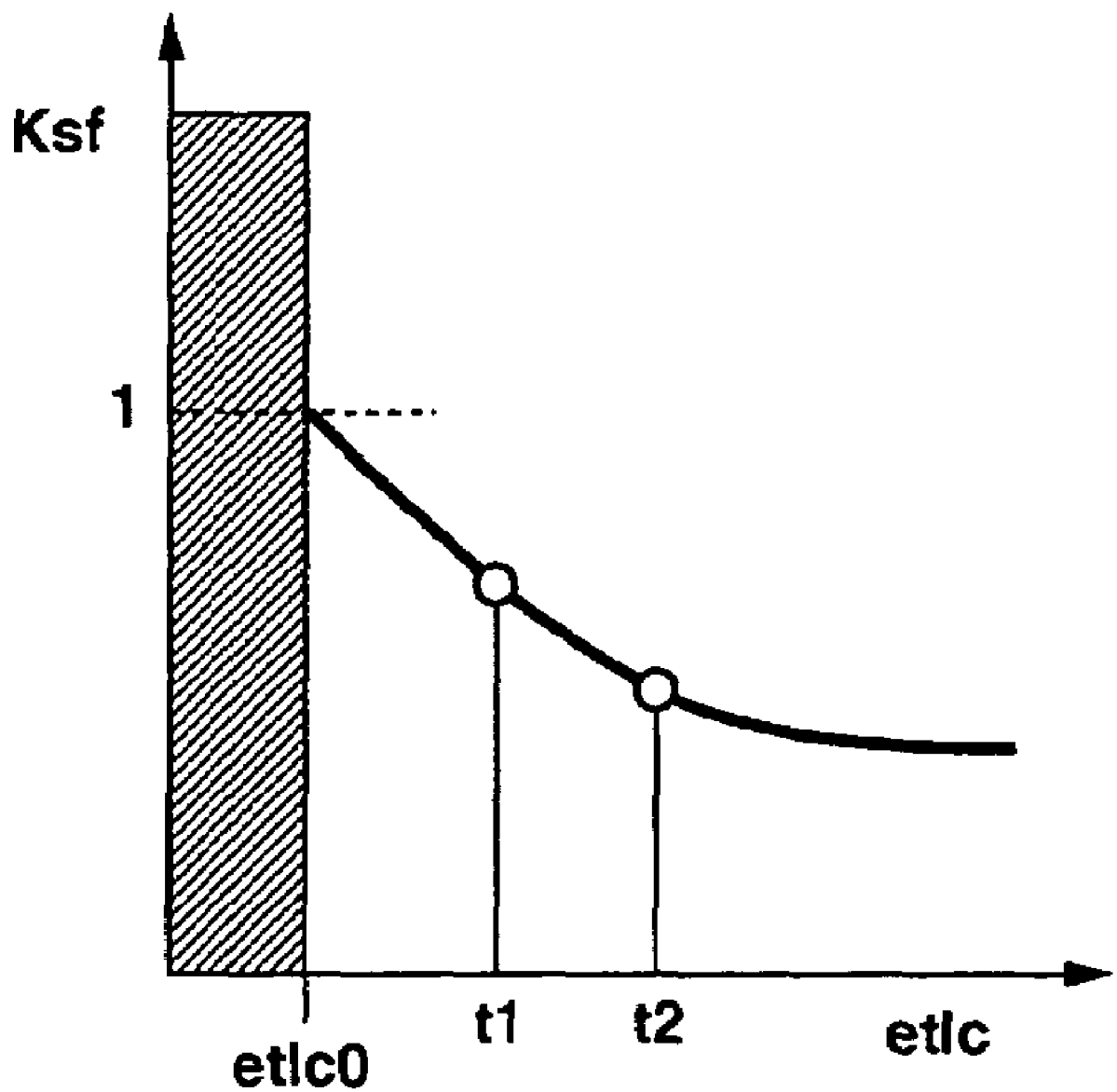
FIG. 15 illustrates characteristics of coefficient Ksf relative to different values of elapsed time etlc greater than a predetermined value etlc0.

FIG. 15 illustrates characteristics of function f(etlc). As shown in FIG. 15, the coefficient Ksf falls below 1 as the elapsed time etlc increases above the predetermined value etlc0. When the elapsed time etlc is equal to the predetermined value etlc0, the coefficient Ksf is equal to 1 (Ksf=1). Setting the coefficient Ksf as illustrated in FIG. 15 makes it possible to further reduce the time constant term (Ksf×Tsf etlc) as the elapsed time etlc increases.

If, at step S308, the result of the determination is negative, the logic goes to step S310.

At step S310, the controller 150 sets the accelerator pedal reaction force instruction value FA as the corrected accelerator pedal reaction force instruction value FAc.

At the next step S311, the controller 150 provides, as an output, the corrected accelerator pedal reaction force instruction value FAc that has been determined at step S208 or S209 to the accelerator pedal reaction force control unit 170.

In the modification described above, the time constant Tsf etlc is determined based on the elapsed time etlc function shown in FIG. 12, and the coefficient Ksf is multiplied with the time constant Tsf etlc only when the elapsed time etlc is longer the predetermined value etlc0 to provide the corrected accelerator pedal reaction force instruction value Fac. This means that the accelerator pedal reaction force instruction value FA remains uncorrected when the elapsed time etlc is equal to or less than the predetermined value etlc0. Appropriately setting the predetermined value etlc0 makes it easy to tune the driving assistance system to meet various demands.

One may fix the time constant Tsf etlc at a predetermined value. In this case, the product of a coefficient Ksf and the time constant Tsf etlc is provided, and various values of Ksf with different values of the elapsed time etlc are predetermined and retrieved versus the calculated value of the etlc.

Third Exemplary Implementation of the Disclosure

Figure 16:
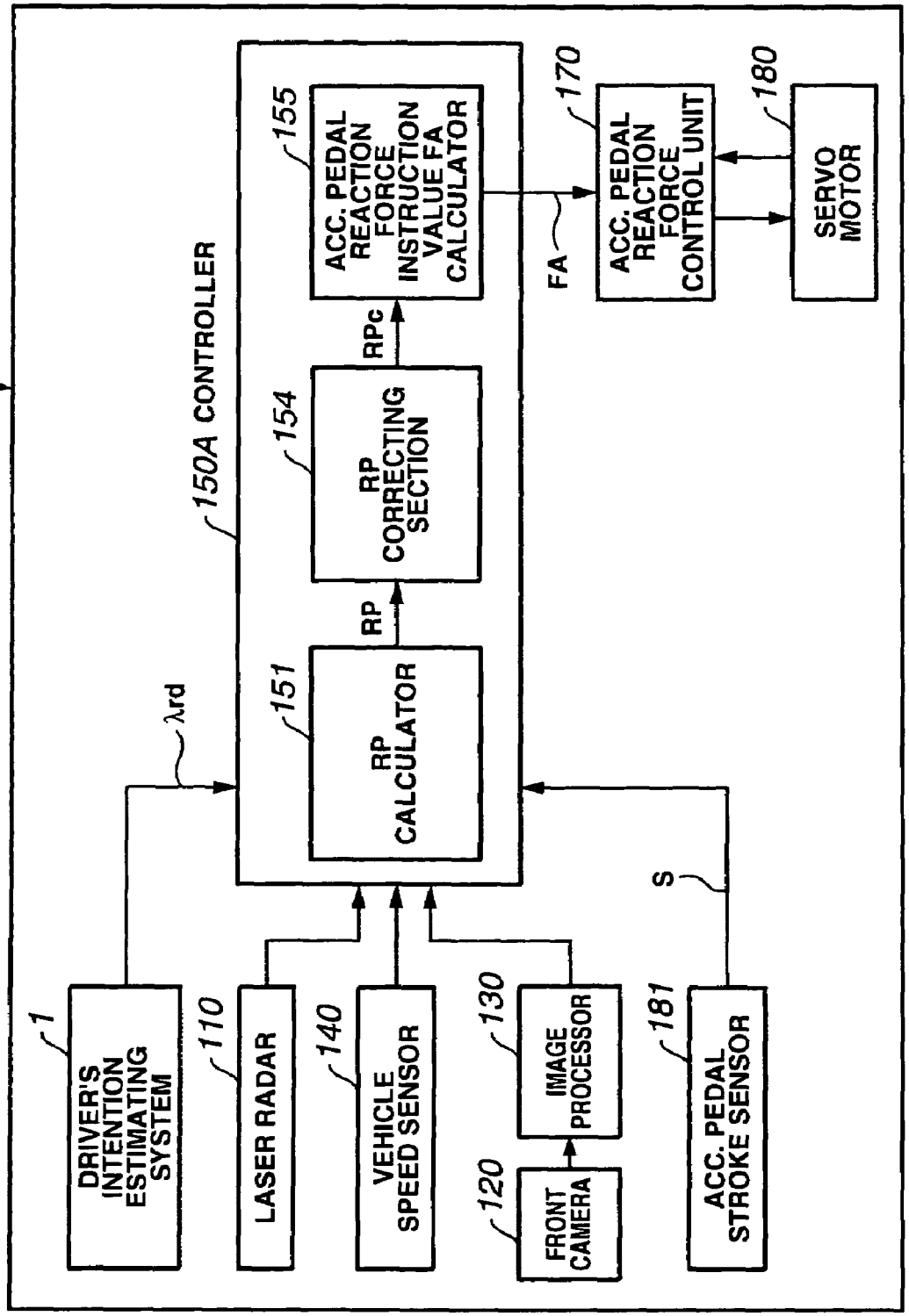
FIG. 16 is a block diagram of another exemplary implementation of a driving assistance system according to the present disclosure.

Referring to FIG. 16, another exemplary implementation of a driving assistance system 200 according to the present disclosure is described. The driving assistance system 200 is substantially the same as the driving assistance system 100 illustrated in FIG. 7. Thus, like reference numerals are used to designate like parts or portions throughout FIGS. 7 and 16. However, the driving assistance system 200 is different from the driving assistance system 100 in the following respects:

Different from the driving assistance system 100, the driving assistance system 200 corrects a risk potential RP upon determination that the estimated driver's intention λrd is indicative of a lane-change intention. The driving assistance system 200 includes a controller 150A. The controller 150A is provided with a software implementation of a risk potential (RP) calculator 151, a risk potential (RP) correcting section 154, and an accelerator pedal reaction force instruction value FA calculator 155.

Figure 17:
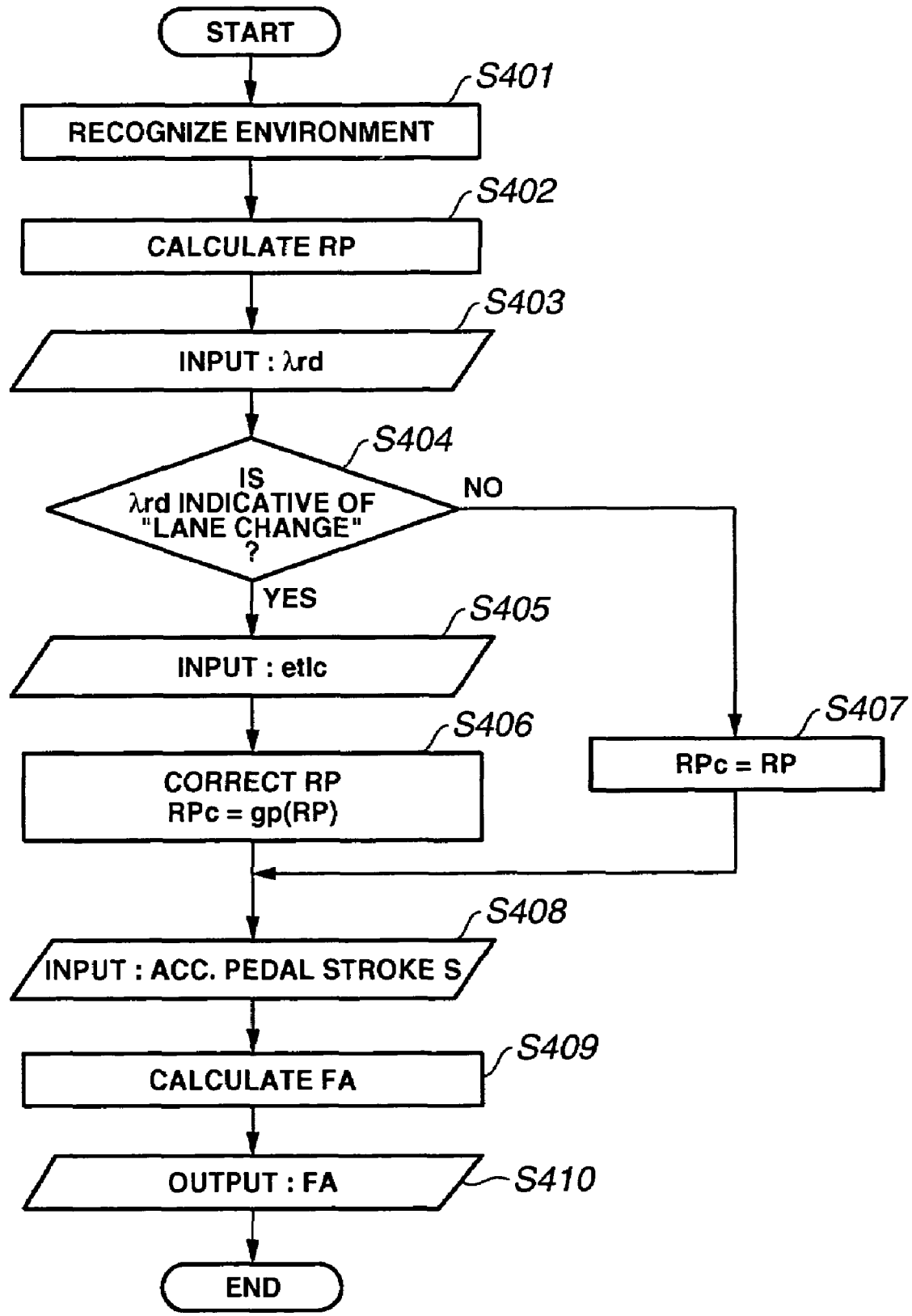
FIG. 17 is a flow chart showing the operation of the driving assistance system illustrated in FIG. 16.

The flow chart in FIG. 17 illustrates a control routine of a driving assistance control program stored in the controller 150A. The execution of the control routine is repeated at a constant interval of, for example, 50 msec. The flow chart illustrated in FIG. 17 has steps S401 and 402, which are comparable to the steps S201 and S202 of the flow chart illustrated in FIG. 10. Thus, the controller 150A performs substantially the same tasks down to step S402.

At step S403, the controller 150A reads, as an input, an estimated real driver's intention λrd determined at a real driver's intention estimating system 1 (see FIG. 16).

At step S404, the controller 150A determines whether or not the estimated driver's intention λrd is indicative of a lane-change intention. If this is the case, the logic goes to step S405.

At step S405, the controller 150A reads, as an input, the elapsed time etlc calculated at the real driver's intention estimating system 1.

At step S406, the controller 150A corrects the risk potential RP to provide a corrected risk potential RPc. In this exemplary implementation, the risk potential RP is processed by a low-pass filter and decreased. In this case, the corrected risk potential RPc may be expressed as:

$$RPc = gp(RP) = kp \cdot \{1/(1+Tsp\ etlc)\} \cdot RP \quad \text{(Eq. 20)}$$

where: kp is an appropriately determined constant, and Tsp etlc is a time constant of the low-pass filter, which is determined as a function of the elapsed time etlc and may be expressed as:

$$Tsp\ etlc = f(etlc) \quad \text{(Eq. 21)}$$

Figure 18:
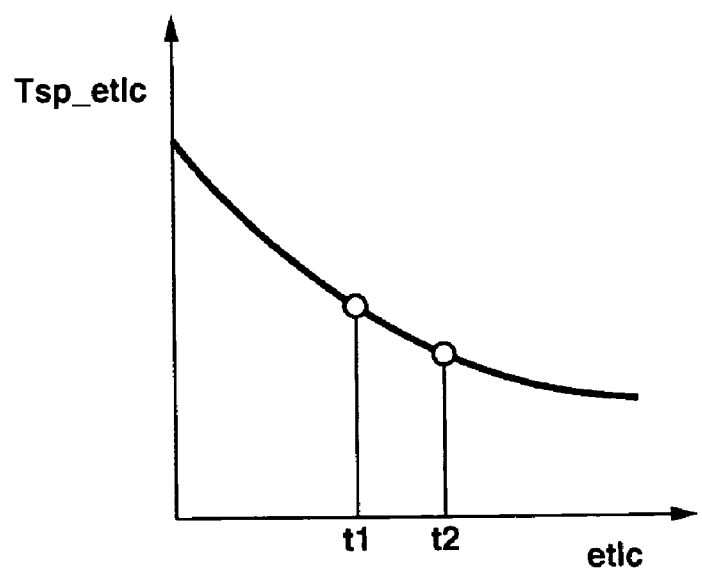
FIG. 18 illustrates different values of time constant Tsp_etlc relative to different values of elapsed time etlc.

FIG. 18 illustrates characteristics of the function f(etlc). As illustrated in FIG. 18, the time constant Tsp etlc decreases as the elapsed time etlc increases. Setting the time constant Tsp etlc in this way allows a faster reduction of the accelerator pedal reaction force by lowering the risk potential RP.

If, at step S404, the controller 150A determines that the estimated driver's intention λrd is indicative of a lane-keeping intention, the logic goes to S407.

At step S407, the controller 150A sets the risk potential RP as the corrected risk potential RPc.

At the next step S406, the controller 150A receives, as an input, an accelerator pedal stroke S by reading operation of the output of an accelerator pedal stroke sensor 181.

At step S409, the controller 150A calculates an accelerator pedal reaction force instruction value FA. First, the controller 150A calculates a reaction force increment ΔF in response to the corrected risk potential RPc by, for example, referring to the characteristic curve shown in FIG. 11. Then, the controller 150A calculates the sum of the reaction force increment ΔF and the ordinary reaction force characteristic to provide an accelerator pedal reaction force instruction value FA.

At the next step S410, the controller 150A provides, as an output, the accelerator pedal reaction force instruction value FA to an accelerator pedal reaction force control unit 170.

The accelerator pedal reaction force control unit 170 controls a servo motor 180 in response to the accelerator pedal reaction force instruction value FA.

Figures 19A, 19B:
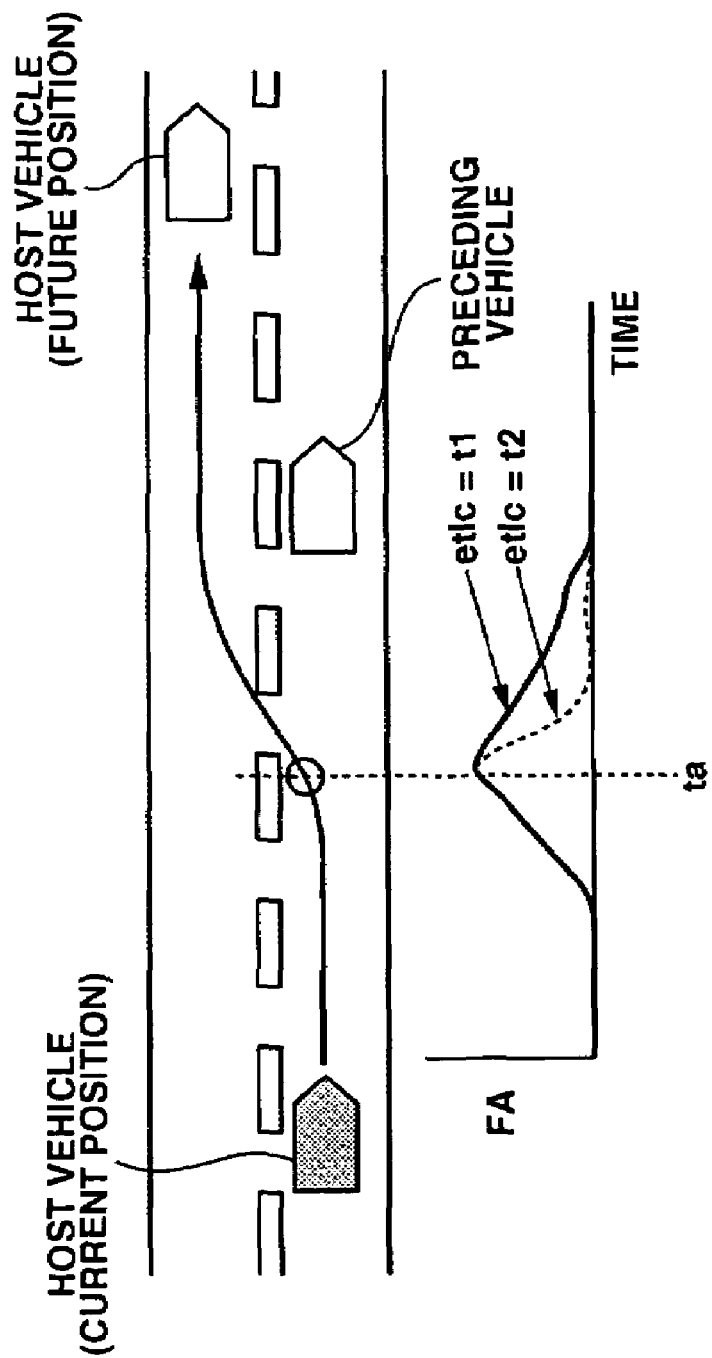
FIG. 19(a) illustrates a traffic scene in which a vehicle changes lanes to pass the preceding vehicle.
FIG. 19(b) illustrates an accelerator pedal reaction force instruction value FA in response to the estimated driver's lane-change intention.

Referring to FIGS. 19(a) and 19(b), the driving assistance system 200 is further described. FIG. 19(a) illustrates a traffic scene in which the host vehicle is changing lanes to pass the preceding vehicle. FIG. 19(b) illustrates two curves, L1 (in solid line) and L2 (in dotted line), of the corrected accelerator pedal reaction force instruction value FA in response to the estimated driver's lane-change intention. As illustrated by L1 and L2, at time ta, it is determined that the estimated driver's intention λrd is indicative of a lane-change intention. The accelerator pedal reaction force instruction value FA drops to allow a smooth driver's manipulation of the accelerator pedal 160 for the lane-change and the subsequent passing the preceding vehicle.

In FIG. 19(b), curve L1 illustrates that the accelerator pedal reaction force instruction value FA drops gradually when the elapsed time etlc is equal to t1. On the other hand, curve L2 illustrates that the accelerator pedal reaction force instruction value FA drops quickly when the elapsed time etlc is equal to t2, wherein t2 is larger than t1.

This exemplary implementation has an effect as follows: The controller 150A is provided with the risk potential RP correcting section 154, which corrects the relationship between the obstacle state, including the preceding vehicle, around the host vehicle and the risk potential RP. The risk potential RP correcting section 154 further decreases the risk potential RP as the elapsed time etlc increases upon determination of the estimated driver's intention λrd. This make it possible to a faster drop of the accelerator pedal reaction force to meet the driver's expectation that the accelerator pedal reaction force be quickly reduced after the driver has retained the lane-change intention for a long period of time.

Modification of the Third Exemplary Implementation

Figure 20:
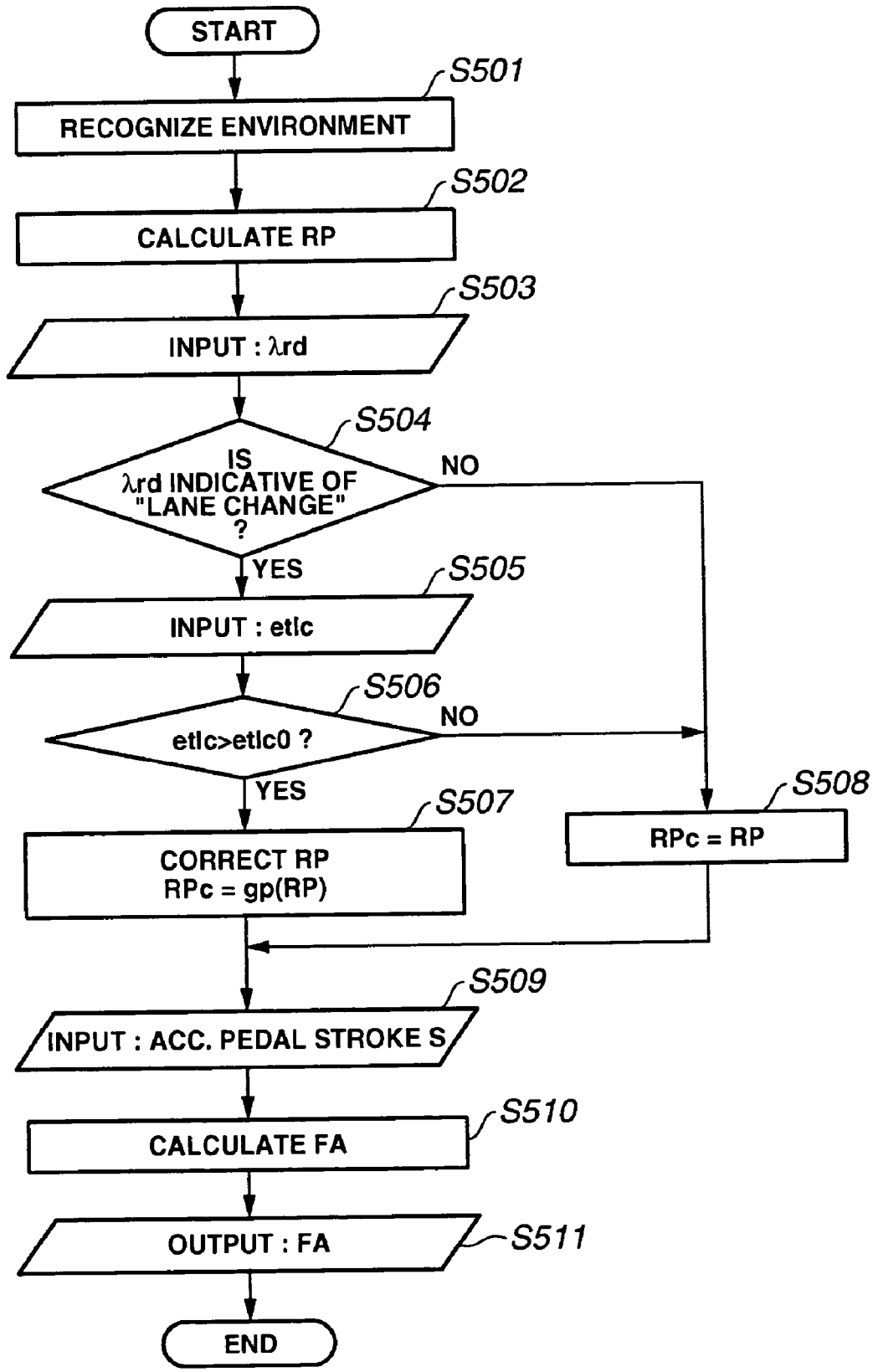
FIG. 20 is a flow chart of the exemplary implementation illustrated in FIGS. 16 to 19(b).

In this modification, the risk potential RP is corrected only when the elapsed time etlc is longer than a predetermined value etlc0. FIG. 20 shows a flow chart illustrating a control routine of a driving assistance control program stored in the controller 150A. The execution of the control routine is repeated at a regular interval of, for example, 50 msec. The flow chart illustrated in FIG. 20 has steps S501 and S505, which are comparable to the steps S401 and S405 of the flow chart illustrated in FIG. 17. Thus, the controller 150A performs substantially the same jobs down to step S505. In FIG. 20, at step S506, the controller 150A determines whether or not elapsed time etlc is longer than a predetermined value etlc0. If, at step S506, the controller 150A determines that the elapsed time etlc is longer than the predetermined value etlc0, the logic goes to step S507. At step S507, the controller 150A corrects a risk potential RP, which has been calculated at step S502, based on the elapsed time etlc. Specifically, the controller 150A corrects the risk potential RP by calculating the following equation to provide a corrected risk potential RPc.

$$RPc = gp(RP) = kp \cdot \{1/(1+Ksp \times Tsp\ etlc)\} \cdot RP \quad \text{(Eq. 22)}$$

where: kp is an appropriately determined constant, Tsp etlc is a time constant of the low-pass filter, and Ksp is a coefficient, which is a function of the elapsed time etlc and may be expressed as:

$$Ksp = f(etlc) \quad \text{(Eq. 23)}$$

Figure 21:
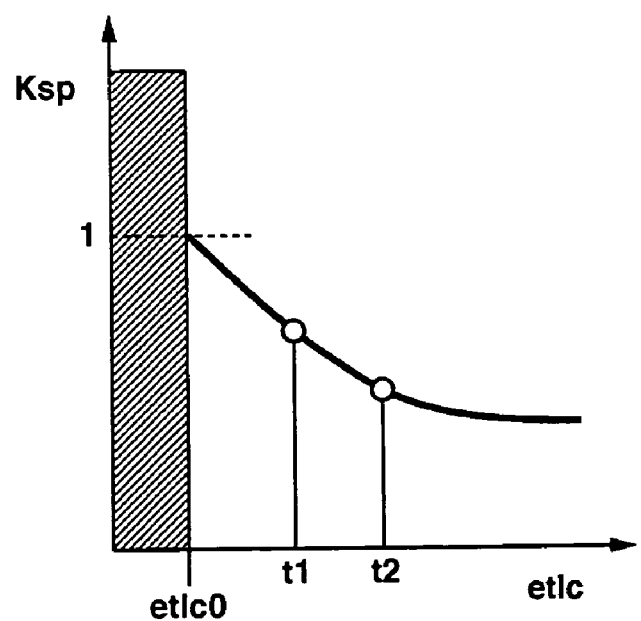
FIG. 21 illustrates characteristics of coefficient Ksp relative to different values of elapsed time etlc greater than a predetermined value etlc0.

FIG. 21 illustrates characteristics of function f(etlc). As illustrated in FIG. 21, the coefficient Ksp decreases below 1 as the elapsed time etlc increases above the predetermined value etlc0. When the elapsed time etlc is equal to the predetermined value etlc0, the coefficient Ksp is equal to 1 (Ksp=1). Setting the coefficient Ksp as illustrated in FIG. 21 allows a faster reduction of the time constant term (Ksp×Tsp etlc) as the elapsed time etlc increases.

If, at step S506, the result of the determination is negative, the logic goes to step S508.

At step S508, the controller 150A sets the risk potential RP as the corrected risk potential RPc.

At the next step S509, the controller 150A receives, as an input, an accelerator pedal stroke S by reading operation of the output of an accelerator pedal stroke sensor 181.

At step S510, the controller 150A calculates an accelerator pedal reaction force instruction value FA. First, the controller 150A calculates a reaction force increment ΔF in response to the corrected risk potential RPc by, for example, referring to the characteristic curve shown in FIG. 11. Then, the controller 150A calculates the sum of the reaction force increment ΔF and the ordinary reaction force characteristic to provide an accelerator pedal reaction force instruction value FA.

At the next step S511, the controller 150A provides, as an output, the accelerator pedal reaction force instruction value FA to an accelerator pedal reaction force control unit 170.

The accelerator pedal reaction force control unit 170 controls a servo motor 180 in response to the accelerator pedal reaction force instruction value FA.

In the modification described above, the time constant Tsp etlc is determined based on the elapsed time etlc function illustrated in FIG. 18 of the, and the coefficient Ksp is multiplied by the time constant Tsp etlc only when the elapsed time etlc is longer the predetermined value etlc0, to provide the corrected risk potential RPc. This means that the accelerator pedal reaction force instruction value FA remains uncorrected when the elapsed time etlc is equal to or shorter than the predetermined value etlc0. Appropriately setting the predetermined value etlc0 makes it easy to tune the driving assistance system to meet various demands.

The time constant Tsp etlc may be set as a constant value. In this case, the product of a coefficient Ksp and the time constant Tsp etlc is provided, and various values of Ksp with different values of the elapsed time etlc are predetermined and retrieved depending on the calculated value of the etlc.

In the driving assistance systems 100 and 200, the risk potential RP is determined by the reciprocal of TTC and the reciprocal of THW. If desired, a risk potential RP might be a function of the reciprocal of TTC only.

Although the disclosure has been shown and described with respect to the exemplary implementations, it is obvious that equivalent alterations and modifications will occur to those skilled in the art upon reading and understanding of the specification. The present disclosure includes all such equivalent alterations and modifications, and is limited only by the scope of the claims.

What is claimed is:

1. An operation assistance method comprising the steps of:
   detecting an operation performed by a real operator of a machine, wherein the operation may correspond to multiple possible intentions;
   generating data related to one or more imaginary operators based on the detected operation of the real operator; and
   determining an estimated intention of the real operator based on the generated data related to the one or more imaginary operators.

2. The method of claim 1 further comprising the steps of:
   generating data related to an estimated period of time that the real operator retains the estimated intention; and
   generating a state of the estimated intention of the real operator based on the estimated period of time, wherein the state of the estimated intention indicates a degree of reliability of the estimated intention of the real operator.

3. The method of claim 2, wherein the step of generating data related to an estimated period of time comprises the steps of:
   generating data related to an estimated intention of the real operator at a specific point in time and at least one past estimated intention of the real operator before the specific point in time; and
   generating data related to the estimated period of time based on the data related to the estimated intention of the real operator at the specific point in time and the at least one past estimated intention of the real operator before the specific point in time.

4. The method of claim 1, wherein:
   the machine is a vehicle; and
   the real operator is a driver of the vehicle.

5. The method of claim 1, wherein:
   the detecting step detects an operation of the real operator at each one of different points in time; and
   the step of generating data related to the one or more imaginary operators comprises the steps of:
   providing data related to a plurality of imaginary operators, each of the plurality of imaginary operators associated with a sequence of intentions corresponding to the different points in time, wherein each of the sequence of intentions is associated with an operation;
   for each imaginary operator, calculating a likelihood value based on partial likelihood values of each imaginary operator corresponding to the different points in time, wherein each of the partial likelihood values is respectively associated with each of the sequence of intentions and the respective operation at each one of the different points in time, and is generated based on the respective detected operation of the real operator at each one of the different points in time and the respective operation of the respective one of the plurality of imaginary operators at each one of the different points in time;
   selecting one of the plurality of imaginary operators based on the likelihood value of each one of the imaginary operators; and
   generating the estimated intention of the real operator based on a chosen intention of the selected one of the imaginary operators.

6. The method of claim 5, wherein the step of generating data related to one or more imaginary drivers comprises the steps of:
   determining the point in time corresponding to the chosen intention;
   for the selected one of the plurality of imaginary operators, determining the point in time corresponding to the last intention in the sequence of intentions that is different from the chosen intention; and
   determining a period of time that the chosen intention is retained by the selected one of the plurality of imaginary operators, based on the point in time corresponding to the chosen intention and the point in time corresponding to the last intention in the sequence of intentions that is different from the chosen intention; and
   generating the state of the estimated intention based on the determined period of time.

7. The method of claim 4 further comprising the steps of:
   generating a state of the estimated intention based on the estimated period of time, wherein the state of the estimated intention indicates a degree of reliability of the estimated intention;
   calculating a risk potential associated with the vehicle;
   calculating a reaction force based on the calculated risk potential, the estimated intention and the state of the estimated intention; and
   applying the reaction force to a vehicle control device of the vehicle.

8. The method of claim 7, wherein the vehicle control device is an acceleration pedal or a steering wheel.

9. The method of claim 7, wherein the step of calculating a reaction force comprises the steps of:
   modifying the risk potential based on the state of the estimated intention; and
   calculating the reaction force based on the modified risk potential and the estimated intention.

10. The method of claim 7, wherein the step of calculating a reaction force comprises the steps of:
  calculating the reaction force based on the calculated risk potential and the estimated intention; and
  modifying the calculated reaction force based on the state of the estimated intention.

11. The method of claim 1 further comprising the steps of:
  generating a state of the estimated intention based on the estimated period of time, wherein the state of the estimated intention indicates a degree of reliability of the estimated intention; and
  modifying the operation of the machine based on the state of the estimated intention of the real operator.

12. An operation assistance system comprising:
  a first device configured to detect an operation performed by a real operator of a machine, wherein the operation may correspond to multiple possible intentions;
  a second device configured to generate data related to one or more imaginary operators based on the detected operation of the real operator; and
  a third device configured to determine an estimated intention of the real operator based on the generated data related to the one or more imaginary operators.

13. The method of claim 12, wherein the third device is configured to generate data related to an estimated period of time that the real operator retains the estimated intention, and to generate a state of the estimated intention based on the estimated period of time.

14. The method of claim 13, wherein the third device is configured to generate data related to an estimated intention of the real operator at a specific point in time and at least one past estimated intention of the real operator before the specific point in time, and to generate data related to the estimated period of time based on the data related to the estimated intention of the real operator at the specific point in time and the at least one past estimated intention of the real operator before the specific point in time.

15. The system of claim 12, wherein:
  the machine is a vehicle; and
  the real operator is a driver of the vehicle.

16. The system of claim 12, wherein:
  the first device is configured to detect an operation of the real operator at each one of different points in time; and
  the second device is configured to perform the steps of:
    providing data related to a plurality of imaginary operators, each of the plurality of imaginary operators associated with a sequence of intentions corresponding to the different points in time, wherein each of the sequence of intentions is associated with an operation;
    for each imaginary operator, calculating a likelihood value based on partial likelihood values of each imaginary operator corresponding to the different points in time, wherein each of the partial likelihood values is respectively associated with each of the sequence of intentions and the respective operation at each one of the different points in time, and is generated based on the respective detected operation of the real operator at each one of the different points in time and the respective operation of the respective one of the plurality of imaginary operators at each one of the different points in time;
    selecting one of the plurality of imaginary operators based on the likelihood value of each one of the imaginary operators; and
    generating the estimated intention of the real operator based on a chosen intention of the selected one of the imaginary operators.

17. The system of claim 16, wherein second device is configured to perform the steps of:
  determining the point in time corresponding to the chosen intention;
  for the selected one of the plurality of imaginary operators, determining the point in time corresponding to the last intention in the sequence of intentions that is different from the chosen intention; and
  determining a period of time that the chosen intention is retained by the selected one of the plurality of imaginary operators, based on the point in time corresponding to the chosen intention and the point in time corresponding to the last intention in the sequence of intentions that is different from the chosen intention;
  generating a state of the estimated intention based on the determined period of time.

18. The system of claim 15 further comprising:
  a device configured to determine a state of the estimated intention based on the data related to one or more imaginary operators;
  a risk calculation device configured to calculate a risk potential associated with the vehicle;
  a reaction force calculation device configured to calculate a reaction force based on the calculated risk potential, the estimated intention and the state of the estimated intention; and
  applying the reaction force to a vehicle control device of the vehicle.

19. The system of claim 18, wherein the vehicle control device is an acceleration pedal or a steering wheel.

20. An operation assistance system comprising:
  means for detecting an operation performed by a real operator of a; machine, wherein the operation may correspond to multiple possible intentions;
  means for generating data related to one or more imaginary operators based on the detected operation; and
  means for determining an estimated intention of the real operator based on the generated data related to one or more imaginary operators.

21. A machine-readable medium bearing instructions for assisting operation of a machine, the instructions, upon execution by a data processing system, causing the data processing system to perform the steps of:
  receiving data related to an operation performed by a real operator of the machine, wherein the operation may correspond to multiple possible intentions;
  generating data related to one or more imaginary operators based on the detected operation; and
  determining an estimated intention of the real operator based on the generated data.

22. A vehicle comprising:
  a first device configured to detect an operation performed by a driver of the vehicle, wherein the operation may correspond to multiple possible intentions;
  a second device configured to generate data related to one or more imaginary drivers based on the detected operation, wherein each of the imaginary drivers is associated with a pre-assigned operation; and
  a third device configured to determine an estimated intention of the driver based on the generated data related to the one or more imaginary drivers.

23. The vehicle of claim 22 further comprising a control device to determine a state of the estimated intention of the driver and control the operation of the vehicle based on the identified state of the estimated intention of the driver.

24. An operation assistance method comprising the steps of:

detecting an operation performed by an operator of a machine, wherein the operation may correspond to multiple possible intentions;

estimating an intention of the operator based on the detected operation;

generating data related to the estimated intention of the operator based on the detected operation; and identifying a state of the estimated intention of the operator based on the generated data.

25. An operation assistance system comprising:

a first device configured to detect an operation performed by an operator of a machine, wherein the operation may correspond to multiple possible intentions;

a second device configured to estimate an intention of the operator based on the detected operation;

a third device configured to generate data related to the estimated intention of the operator based on the detected operation; and a fourth device configured to identify a state of the estimated intention of the operator based on the generated data.

26. An operation assistance system comprising:

means for detecting an operation performed by an operator of a machine, wherein the operation may correspond to multiple possible intentions;

means for estimating an intention of the operator based on the detected operation;

means for generating data related to the estimated intention of the operator based on the detected operation; and means for identifying a state of the estimated intention of the operator based on the generated data.

27. A computer readable storage medium having stored therein data representing instructions executable by a computer to assist operation of a machine, comprising:

instructions to detect an operation performed by an operator of a machine, wherein the operation may correspond to multiple possible intentions;

instructions to estimate an intention of the operator based on the detected operation;

instructions to generate data related to the estimated intention of the operator based on the detected operation; and instructions to identify a state of the estimated intention of the operator based on the generated data.

28. A vehicle comprising:

a first device configured to detect an operation performed by an operator of the vehicle, wherein the operation may correspond to multiple possible intentions;

a second device configured to estimate an intention of the operator based on the detected operation;

a third device configured to generate data related to the estimated intention of the operator based on the detected operation; and a fourth device configured to identify a state of the estimated intention of the operator based on the generated data.

* * * * *

UNITED STATES PATENT AND TRADEMARK OFFICE
CERTIFICATE OF CORRECTION

| | | |
|---|---|---|
| PATENT NO. | : 7,386,371 B2 | Page 1 of 1 |
| APPLICATION NO. | : 11/012208 | |
| DATED | : June 10, 2008 | |
| INVENTOR(S) | : Nobuyuki Kuge et al. | |

It is certified that error appears in the above-identified patent and that said Letters Patent is hereby corrected as shown below:

On the title page of the patent, under section "(30) Foreign Application Priority Data", delete the first two listed priority applications "December 16, 2003 (JP) …………..2003-417744" and "December 16, 2003 (JP) …………....2003-417746".

Signed and Sealed this

Tenth Day of February, 2009

JOHN DOLL
*Acting Director of the United States Patent and Trademark Office*